(12) United States Patent
Tada et al.

(10) Patent No.: US 9,803,686 B2
(45) Date of Patent: Oct. 31, 2017

(54) HYDROSTATIC PRESSURE GUIDE MECHANISM AND MACHINE TOOL

(71) Applicants: Toshiba Kikai Kabushiki Kaisha, Chiyoda-ku, Tokyo (JP); Yugen Kaisha Newly Laboratory, Uji-shi, Kyoto (JP)

(72) Inventors: Atsushi Tada, Numazu (JP); Makoto Sagara, Shizuoka (JP); Teruaki Tsukiji, Gotemba (JP); Takao Arai, Uji (JP)

(73) Assignees: TOSHIBA KIKAI KABUSHIKI KAISHA, Chiyoda-Ku, Tokyo (JP); YUGEN KAISHA NEWLY LABORATORY, Uji-Shi, Kyoto (JP)

( * ) Notice: Subject to any disclaimer, the term of this patent is extended or adjusted under 35 U.S.C. 154(b) by 38 days.

(21) Appl. No.: 14/924,347

(22) Filed: Oct. 27, 2015

(65) Prior Publication Data

US 2016/0115994 A1   Apr. 28, 2016

(30) Foreign Application Priority Data

Oct. 28, 2014   (JP) .................................. 2014-219651

(51) Int. Cl.
*F16C 29/02* (2006.01)
*B23Q 1/38* (2006.01)

(52) U.S. Cl.
CPC .............. *F16C 29/025* (2013.01); *B23Q 1/38* (2013.01); *F16C 2322/39* (2013.01)

(58) Field of Classification Search
CPC .............. F16C 32/0633; F16C 32/0644; F16C 32/0651; F16C 32/0655; F16C 32/0659; F16C 29/025; F16C 2322/39; B23Q 1/38
See application file for complete search history.

(56) References Cited

U.S. PATENT DOCUMENTS 3,355,990 A * 12/1967 Thum ...................... B23Q 1/38
   184/6
3,610,365 A * 10/1971 Maddox ................. B60V 3/025
   180/125

(Continued)

FOREIGN PATENT DOCUMENTS

CN        202716063        2/2013
GB        1073442 A *      6/1967    ............... B23Q 1/38

(Continued)

OTHER PUBLICATIONS

English Language Abstract and Machine Translation of JP 2004-058192 published Feb. 26, 2004.

(Continued)

*Primary Examiner* — Alan B Waits
(74) *Attorney, Agent, or Firm* — DLA Piper LLP US

(57) ABSTRACT

A hydrostatic pressure guide mechanism includes: a guide member having a smooth guide surface; a movement member having a slide surface facing the guide surface and an annular placement groove formed on the slide surface; an annular seal member (hermetically closing member) that is disposed in the placement groove and capable of hermetically contacting with the guide surface; an oil supply structure configured to supply an oil into a static pressure pocket on the slide surface surrounded by the seal member; and an oil recovery structure configured to recover the oil from the static pressure pocket, in which the oil recovery structure has a recovery hole that is formed in the static pressure pocket and is opened on the slide surface.

7 Claims, 29 Drawing Sheets

(56) References Cited

U.S. PATENT DOCUMENTS

| | | | | |
|---|---|---|---|---|
| 3,754,799 | A * | 8/1973 | Hedberg | F16C 32/0651 384/114 |
| 3,761,146 | A * | 9/1973 | Unno | F16C 32/0644 384/120 |
| 3,949,996 | A * | 4/1976 | Inoue | F16C 32/0651 277/432 |
| 4,029,323 | A * | 6/1977 | Inoue | F16C 32/0651 277/431 |
| 4,269,458 | A * | 5/1981 | Olsson | F16C 13/04 384/103 |
| 4,285,551 | A * | 8/1981 | Suzuki | B24B 41/007 384/100 |
| 4,333,692 | A * | 6/1982 | Kraus | F16C 32/0648 384/103 |
| 4,865,465 | A * | 9/1989 | Sugita | B23Q 1/38 384/12 |
| 4,974,970 | A * | 12/1990 | Sugita | F16C 32/0659 384/12 |
| 5,391,002 | A * | 2/1995 | Eigenbrod | F16C 32/0659 384/118 |
| 5,628,717 | A * | 5/1997 | Van Haag | D21G 1/022 492/20 |
| 5,971,614 | A * | 10/1999 | Kane | F16C 32/06 384/12 |
| 6,033,116 | A * | 3/2000 | Pflager | B23Q 1/38 384/12 |
| 6,071,013 | A * | 6/2000 | Inaguma | F16C 17/02 384/100 |
| 6,276,491 | B1 * | 8/2001 | Schonfeld | F16C 29/025 137/501 |
| 6,287,004 | B1 * | 9/2001 | Sogard | F16C 29/025 277/431 |
| 6,644,856 | B2 * | 11/2003 | Lasch | F16C 29/025 384/100 |
| 6,935,786 | B2 * | 8/2005 | Hirano | F16C 32/0651 384/118 |
| 7,134,668 | B2 * | 11/2006 | Shinozaki | F16C 29/025 277/431 |
| 7,222,861 | B2 * | 5/2007 | Gittler | F03B 11/006 277/401 |
| 7,232,257 | B2 * | 6/2007 | Sai | F16C 29/025 384/12 |
| 7,287,906 | B2 * | 10/2007 | Wasson | F16C 29/008 384/12 |
| 7,845,853 | B2 * | 12/2010 | Rudy | F16C 29/005 384/12 |
| 8,136,992 | B2 * | 3/2012 | Rudy | F16C 29/007 384/12 |
| 8,167,491 | B2 * | 5/2012 | Bauer | F16C 29/007 384/12 |
| 2004/0042689 | A1 | 3/2004 | Wasson et al. | |
| 2010/0067834 | A1 * | 3/2010 | Menges | F16C 29/025 384/12 |

FOREIGN PATENT DOCUMENTS

| | | |
|---|---|---|
| JP | 2004-058192 | 2/2004 |
| WO | WO 2005/075859 | 8/2005 |

OTHER PUBLICATIONS

Chinese Office Action (with English Translation) issued in Chinese Application No. 201510690527.6 dated Jun. 1, 2017.

English Language Abstract of CN 202716063 dated Feb. 6, 2013.

* cited by examiner

HYDROSTATIC PRESSURE GUIDE MECHANISM AND MACHINE TOOL

The entire disclosure of Japanese Patent Application No. 2014-219651 filed Oct. 28, 2014 is expressly incorporated by reference herein.

TECHNICAL FIELD

The present invention relates to a hydrostatic pressure guide mechanism and a machine tool, more specifically, to a hydrostatic pressure guide mechanism capable of smoothly guiding a guide member and a movement member, which are mutually relatively movable, with a high accuracy while supporting a load using hydrostatic pressure between the guide member and the movement member by supplying oil between the guide member and movement member, and a machine tool provided with the hydrostatic pressure guide mechanism.

BACKGROUND

Typically, various movement mechanisms are used in the machine tool in order to move a workpiece (an object to be machined) and a tool for machining the workpiece to any relative positions.

For instance, linear movement mechanisms are provided in respective X axis, Y axis and Z axis to a support structure of a table on which the workpiece is placed or a support structure of a head to which the tool is attached in order to move the workpiece and/or the tool in three dimensions. Moreover, a rotary movement mechanism is used for changing a posture of the table and/or the head.

Each of the movement mechanisms includes: two relatively movable members (e.g., a guide member and a movement member movable along the guide member); a drive mechanism for moving the two members; and a guide mechanism for securing accuracy (guiding accuracy) of a movement direction or a movement axis.

Such a guide mechanism is required to have a high guiding accuracy, in other words, a geometrical accuracy showing that a linear movement is conducted in a line as straight as possible and a rotational movement is conducted in a circle as perfect as possible. Further, the guide mechanism is required to have a high load capacity, a low friction and a high damping performance (vibration absorption performance)

Specifically, the guiding accuracy of the guide mechanism affects a positioning accuracy of the two relatively movable members, thereby affecting a profile accuracy of a workpiece to be machined. The low friction of the guide mechanism affects the positioning accuracy along a movement axis, thereby affecting the profile accuracy of the workpiece to be machined. Moreover, vibration resistance affects damping of vibration between the two relatively movable members. Specifically, damping level of the vibration generating between the tool and the workpiece affects a machined surface roughness of the workpiece.

Recently, a hydrostatic pressure guide mechanism is used in the guide mechanism of the machine tool (see, for instance, Patent Literature 1 (JP-A-2004-58192)).

In a typical hydrostatic pressure guide mechanism such as the hydrostatic pressure guide mechanism disclosed in Patent Literature 1, a static pressure chamber (i.e., a concave portion into which an oil for supporting a static pressure load is supplied) is formed on one of a pair of slide surfaces. A lubricating oil is supplied into the static pressure chamber, whereby a load is transmitted by the static pressure to the other of the slide surfaces. In other words, only the lubricating oil intervenes between the pair of slide surfaces, so that the pair of slide surfaces are in non-contact with each other, thereby significantly reducing the slide resistance.

The hydrostatic pressure guide mechanism is exemplified by a hydrostatic pressure guide mechanism 8 shown in FIG. 28. The hydrostatic pressure guide mechanism 8 includes: a guide member 89 having a smooth guide surface; a movement member 81 having a slide surface 80 slidable on the surface of the guide member 89; an oil supply structure in a form of a concave portion 82 formed on the slide surface 80 of the movement member 81; an oil supply device 84 configured to supply oil in an oil tank 83 into the concave portion 82; and a hydraulic control valve 85 configured to control a pressure of an oil O in the concave portion 82 to be applied to the guide member 89.

The hydrostatic pressure guide mechanism 8 with this arrangement further includes a recovery portion 86 configured to recover all the oil O overflowing from the concave portion 82 (over the slide surface 80 of the movement member 81) into the oil tank 83 when load transmission is conducted between the slide surface 80 of the movement member and the guide surface of the guide member 89 in such a manner that the slide surface 80 and the guide surface of the guide member 89 are slidable on each other, in which the recovery portion 86 is configured to again supply the oil O recovered by the recovery portion 86 to the concave portion 82. Accordingly, in the hydrostatic pressure guide mechanism 8, the slide surface 80 of the movement member and the guide surface of the guide member 89 are slidable on each other by filling and circulating the oil O in the concave portion 82 and the recovery portion 86.

However, in the hydrostatic pressure guide mechanism 8, the oil O overflowing from the concave portion 82 is spread all over the slide surface 80 of the movement member 81 and subsequently overflows out of the slide surface 80 from the entire outer circumference of the movement member 81. For this reason, in the hydrostatic pressure guide mechanism 8, it is necessary to recover the oil O overflowing out of the slide surface 80 from the outer circumference of the movement member 81, so that the large recovery portion 86 is required.

Moreover, a large amount of the recovered oil cannot be returned through pipes, but is recovered through an open passage next to the guide surface or the slide surface 80. For this reason, a machined material, minute powders of a machined piece, dust and the like are likely to be mixed to degrade the oil in a short time. Moreover, the recovered oil is sheared by the guide mechanism to generate heat. The recovered oil heated to a high temperature is flowed along the slide surface 80 and the guide surface, thereby transmitting heat to a mechanical structure to thermally deform the structure.

Under such conditions, in the hydrostatic pressure guide mechanism 8, since it is necessary to fill the concave portion 82 and a large recovery portion 86 with the oil O, a large amount of the oil O is required when the guide surface of the guide member 89 and the slide surface 80 of the movement member 81 are slid on each other.

The same explanation applies to a heavy-weight support device configured to support a heavy weight in a manner capable of adjusting a position of the heavy weight in a horizontal direction with use of the hydrostatic mechanism.

As for the heavy-weight support device, a device having a seal portion on an outer circumference of the hydrostatic mechanism has been proposed (see Patent Literature 2: International Publication No. 2005/075859).

As shown in FIG. 29, a heavy-weight support device 9 includes: a support body 91 having a mount surface 90 on which a supported body 99 is mounted; an annular seal member 92 provided on the mount surface 90 of the support body 91; an oil supply structure that is positioned in a region surrounded by the seal member 92 on the mount surface 90 and provided in a form of a concave portion 94 communicating with an oil supply hole 93 for supplying the oil O onto the mount surface 90; and an oil supply device 96 configured to supply the oil in an oil tank 95 in the region surrounded by the seal member 92.

Moreover, the heavy-weight support device 9 with this arrangement further includes: valve mechanism 97 configured to stop supplying the oil O after a predetermined amount of the oil O is supplied in the concave portion 94; and a pressure release valve 98 configured to release the state where supplying the oil O in the concave portion 94 is stopped by the valve mechanism 97.

More specifically, the valve mechanism 97 includes a tapered portion 970 formed in the oil supply hole 93 and having a hole diameter decreasing toward the mount surface 90; and a valve body 971 configured to be inserted in the oil supply hole 93 and biased toward the mount surface 90. The valve body 971 includes: a contact portion 972 contactable with the tapered portion 970; and an extension portion 973 extending from the contact portion 972, a part of the extension portion 973 being positioned closer to the supported body 99 relative to the mount surface 90.

The pressure release valve 98 is configured to recover the oil O supplied in a region from the oil supply device 96 to the oil supply hole 93 into the oil tank 95.

Accordingly, in the heavy-weight support device 9 with this arrangement, when the supported body 99 is placed on the mount surface 90, the extension portion 973 of the valve body 971 is pressed by the supported body 99, whereby the tapered portion 970 is separated from the contact portion 972. When the oil O is supplied by the oil supply device 96 into the static pressure pocket P, which is a hermetically closed space on the mount surface 90 defined by the supported body 99 and the seal member 92, to cause the supported body 99 to be separated from the mount surface 90 (in other words, when a predetermined amount of the oil O is supplied into the static pressure pocket P), the contact portion 972 of the valve body contacts with the tapered portion 970 to stop supplying the oil O.

Further, when the oil O supplied in the region from the oil supply device 96 to the oil supply hole 93 is recovered into the oil tank 95 using the pressure release valve 98, an inner pressure of the static pressure pocket P is decreased to cause the extension portion 973 of the valve body 971 to be pressed on the supported body 99, whereby the tapered portion 970 is separated from the contact portion 972 to recover the oil O within the static pressure pocket P into the oil tank 95, so that the supported body 99 is supported on the mount surface in hermetic contact therewith.

Accordingly, when supporting the supported body 99, the heavy-weight support device 9 with this arrangement can keep a pressure of the oil O applied to the supported body 99 without continuously supplying the oil O into the static pressure pocket P.

Accordingly, with a modification of the hydrostatic pressure guide mechanism 8 according to the seal portion on the outer circumference and the supply and recovery of the oil as shown in above-described heavy-weight support device 9, it is expected that the supported body 99 can be supported without the need of a large amount of the oil O as described above in the hydrostatic pressure guide mechanism 8.

However, in the heavy-weight support device 9 described above in Patent Literature 2, since supplying the oil O is stopped after a predetermined amount of the oil O is supplied into the static pressure pocket P, a gap between the mount surface 90 and the supported body 99 cannot be adjusted.

The hydrostatic pressure guide mechanism according to the heavy-weight support device 9 has the same disadvantage.

SUMMARY OF THE INVENTION

In light of the above circumstances, an object of the invention is to provide a hydrostatic pressure guide mechanism capable of adjusting a pressure of an oil depending on a load transmission condition between a guide member and a movement member while reducing a supply amount of the oil, and decreasing a gap between a slide surface of the movement member and a guide surface of the guide member, and a machine tool using the hydrostatic pressure guide mechanism.

According to an aspect of the invention, a hydrostatic pressure guide mechanism includes: a guide member having a smooth guide surface; a movement member having a slide surface facing the guide surface and an annular placement groove formed on the slide surface; an annular hermetically-closing member that is disposed in the placement groove and capable of hermetically contacting with the guide surface; an oil supply structure configured to supply oil into a region on the slide surface surrounded by the hermetically closing member; and an oil recovery structure configured to recover the oil from the region on the slide surface surrounded by the hermetically closing member, in which the oil recovery structure includes a recovery hole that is formed in the region on the slide surface surrounded by the hermetically closing member and is opened on the slide surface.

According to the above aspect of the invention, a hermetically closed space (hereinafter, referred to as a static pressure chamber or a static pressure pocket) is defined by the guide surface of the guide member and the slide surface of the movement member by bringing a hermetically closing member disposed in a placement groove on the slide surface of the movement member into hermetic contact with the guide surface of the guide member. When the oil is supplied into the static pressure pocket through the oil supply structure, loads in directions intersecting with the guide surface and the slide surface are supported by a static pressure of the oil in the static pressure pocket, so that the guide member and the movement member are respectively movable along the guide surface and the slide surface with a slight force.

At this time, when the load applied to between the guide member and the movement member (an external force applied to the hydrostatic pressure guide mechanism) is increased, a gap between the guide surface and the slide surface is decreased to increase the pressure of the oil in the static pressure pocket. On the other hand, when the load applied to between the guide member and the movement member is decreased, the gap between the guide surface and the slide surface is increased to decrease the pressure of the oil in the static pressure pocket. Accordingly, even when the external force applied to the hydrostatic pressure guide mechanism is changed, the static pressure in the static pressure pocket applied to between the guide member and the movement member is maintainable by an appropriate force.

Moreover, since the recovery hole for discharging a lubricating oil in the static pressure pocket to the outside is formed in the region surrounded by the hermetically closing member on the slide surface, the oil can be recovered within the static pressure pocket. Accordingly, by adjusting the amount of the oil flowing in the static pressure pocket, the static pressure applied to between the guide member and the movement member can be adjusted and the oil supplied in the static pressure pocket can be recovered without being flowed to the outside.

The hydrostatic pressure guide mechanism according to the above aspect of the invention may further include a hydraulic control valve configured to adjust a pressure or a flow rate of the oil to be supplied into the region on the slide surface surrounded by the hermetically closing member so as to adjust a pressure applied to the guide surface of the oil to be supplied to the region on the slide surface surrounded by the hermetically closing member.

With this arrangement, the pressure or the flow rate of the oil to be supplied into the region surrounded by the hermetically closing member can be adjusted, so that the pressure applied to the guide surface of the oil to be supplied to the region surrounded by the hermetically closing member can be suitably adjusted.

In the hydrostatic pressure guide mechanism according to the above aspect of the invention, the slide surface of the movement member may include: a pressure holding surface surrounding the recovery hole; and a flank surface surrounding the pressure holding surface, and the pressure holding surface is positioned closer to the guide member than the flank surface is positioned relative to the guide member. In other words, the pressure holding surface may be positioned closer to the guide member than the flank surface is positioned relative to the guide member or a height of the pressure holding surface may be formed higher than that of the flank surface.

With this arrangement, in the static pressure pocket formed on the slide surface of the movement member and facing the guide surface of the guide member, a gap between the pressure holding surface and the guide surface can be made smaller than a gap between the flank surface and the guide surface. Accordingly, the static pressure of the oil in the region corresponding to the flank surface in the static pressure pocket can be kept constant.

In the hydrostatic pressure guide mechanism according to the above aspect of the invention, the oil supply structure may include an annular oil supply groove surrounding the recovery hole.

With this arrangement, while the pressure of the oil in the region from the placement groove to the oil supply groove in the static pressure pocket is kept constant, the guide member and the movement member can be relatively moved with a slight force.

In another aspect of the invention, a machine tool includes: a guide mechanism provided with plural ones of the hydrostatic pressure guide mechanisms according to the above aspect of the invention.

According to the above aspect of the invention, the same advantages of the above-described hydrostatic pressure guide mechanism can be obtained in each of the plurality of hydrostatic pressure guide mechanisms provided in the guide mechanism, so that efficiency of the entire machine tool can be improved.

In the machine tool according to the above aspect of the invention, it is preferable that the oil supply structure and the oil recovery structure are used in common in the plural ones of the hydrostatic pressure guide mechanisms.

With this arrangement, since the oil supply structure and the oil recovery structure are used in common among the plurality of hydrostatic pressure guide mechanisms, equipment can be simplified and a cost can be efficiently reduced.

In the machine tool according to the above aspect of the invention, the oil supply structure preferably includes a hydraulic control valve for each of the plurality of hydrostatic pressure guide mechanisms.

With this arrangement, while the equipment can be simplified by the common use of the oil supply structure and the oil recovery structure, a hydraulic pressure of each of the hydrostatic pressure guide mechanisms can be minutely adjusted by independent hydraulic control valves.

In the machine tool according to the above aspect of the invention, the oil supply structure preferably includes a hydraulic control valve for each of systems comprising the plurality of hydrostatic pressure guide mechanisms.

With this arrangement, while the equipment can be simplified by the common use of the oil supply structure and the oil recovery structure, a hydraulic pressure of each system of the hydrostatic pressure guide mechanisms can be minutely adjusted by independent hydraulic control valves in the each system. Such an adjustment of the each system cannot be conducted so minutely as an adjustment of each of the hydrostatic pressure guide mechanisms, however, the number of the can be decreased as compared with the number of the hydraulic control valve provided to each of the hydrostatic pressure guide mechanisms, thereby efficiently simplifying the equipment.

As described above, the hydrostatic pressure guide mechanism and the machine tool according to the above aspects of the invention can provide excellent advantages of suitably keeping the static pressure of the oil in the static pressure pocket while reducing the supply amount of the oil.

BRIEF DESCRIPTION OF DRAWING(S)

Figure 3:
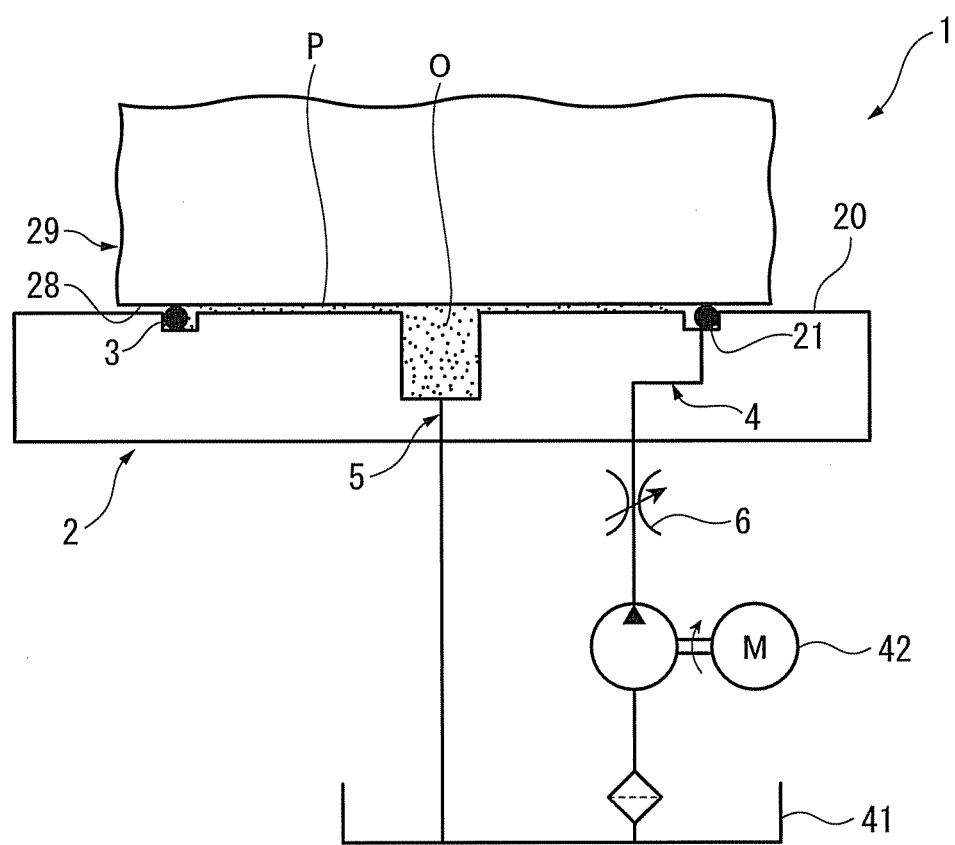

FIG. 3 schematically shows the hydrostatic pressure guide mechanism according to the first exemplary embodiment.

Figure 4:
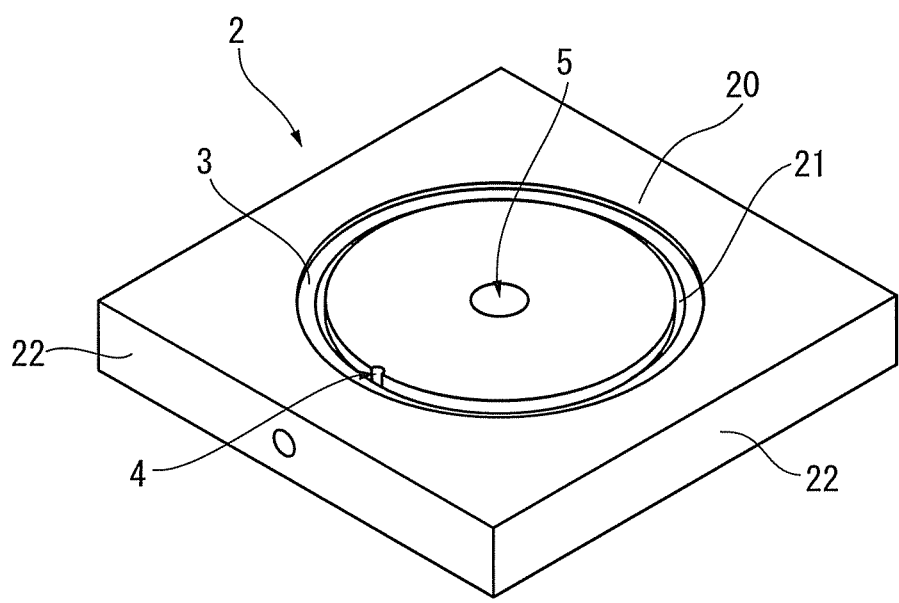

FIG. 4 is a perspective view of a movement member of the hydrostatic pressure guide mechanism according to the first exemplary embodiment.

Figure 5:
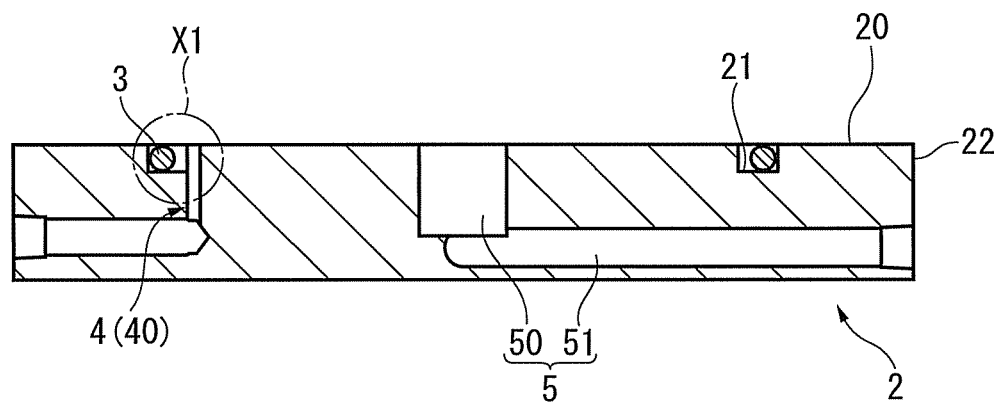

FIG. 5 is a vertically cross-sectional view of the movement member of the hydrostatic pressure guide mechanism according to the first exemplary embodiment.

Figure 6A:
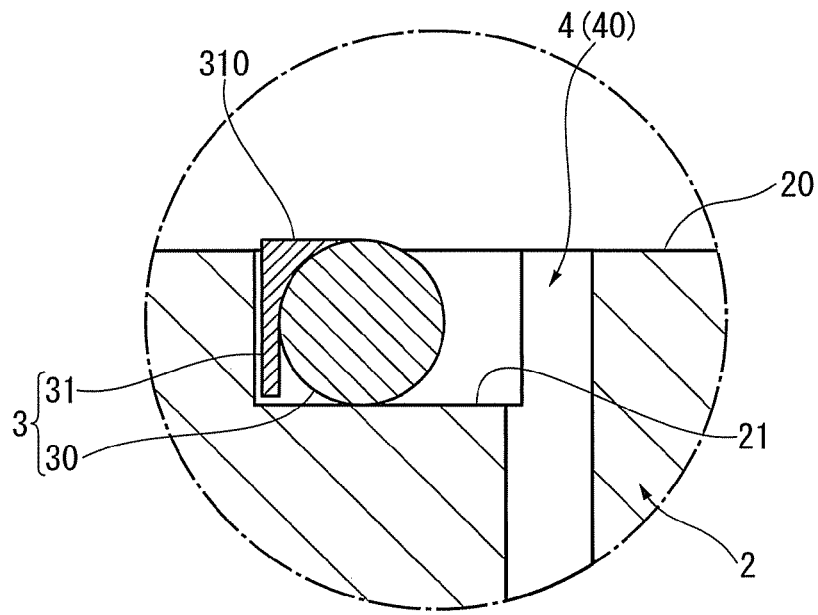

FIG. 6A is an enlarged view showing the movement member of the hydrostatic pressure guide mechanism according to the first exemplary embodiment, specifically, an enlarged view of a region X1 in FIG. 5 before a guide member and the movement member are placed to face each other.

Figure 6B:
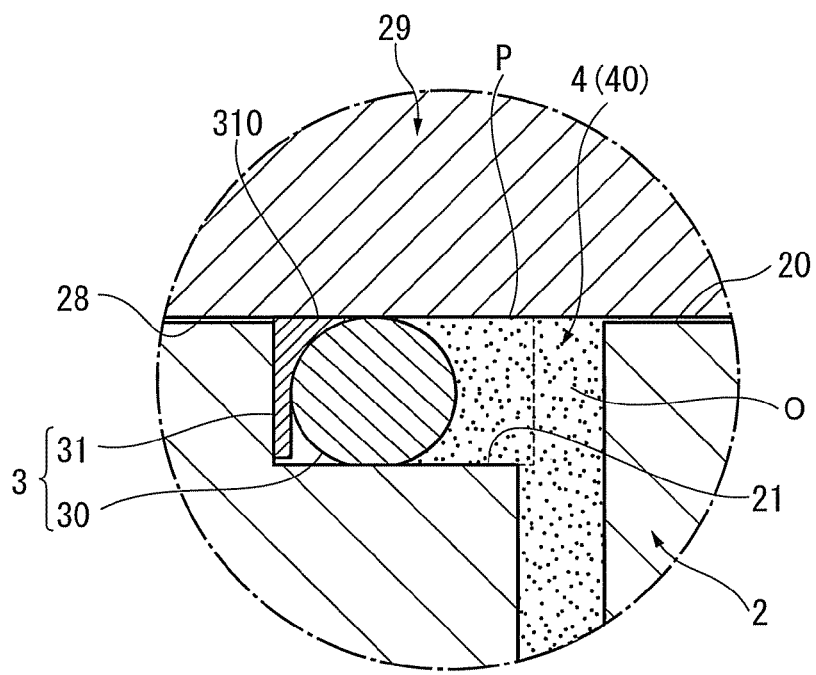

FIG. 6B is an enlarged view showing the movement member of the hydrostatic pressure guide mechanism according to the first exemplary embodiment, specifically, an enlarged view of the region X1 in FIG. 5 when the guide member and the movement member are placed to face each other and oil is supplied into a static pressure pocket.

Figure 7:
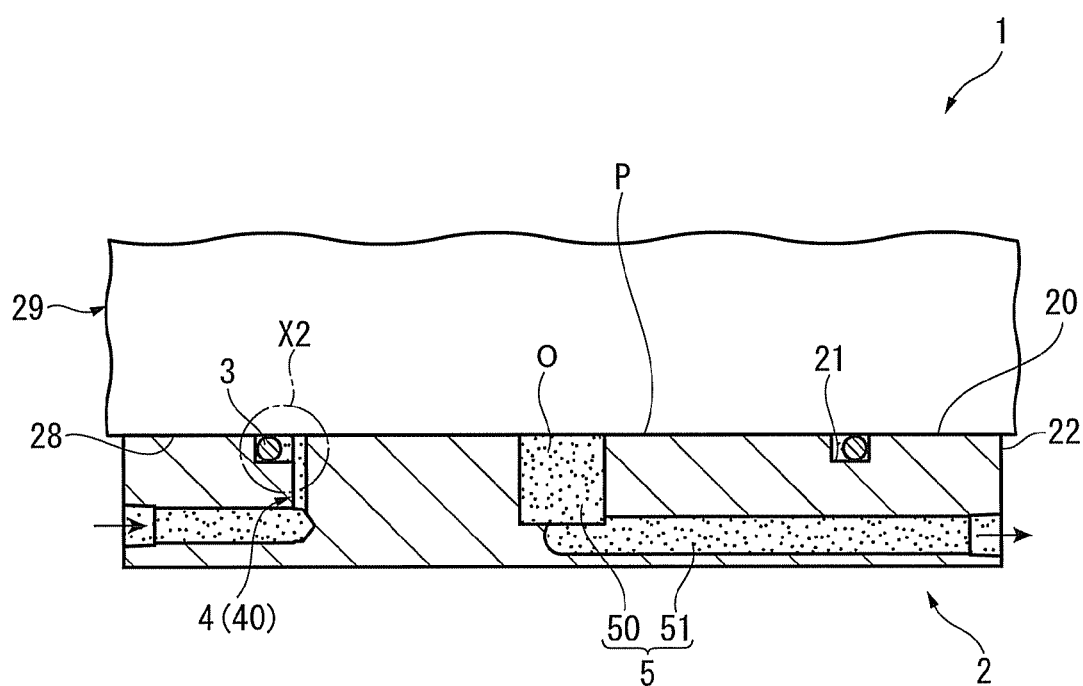

FIG. 7 shows the hydrostatic pressure guide mechanism according to the first exemplary embodiment, in which the guide member and the movement member are placed to face each other and oil is supplied into the static pressure pocket.

Figure 8:
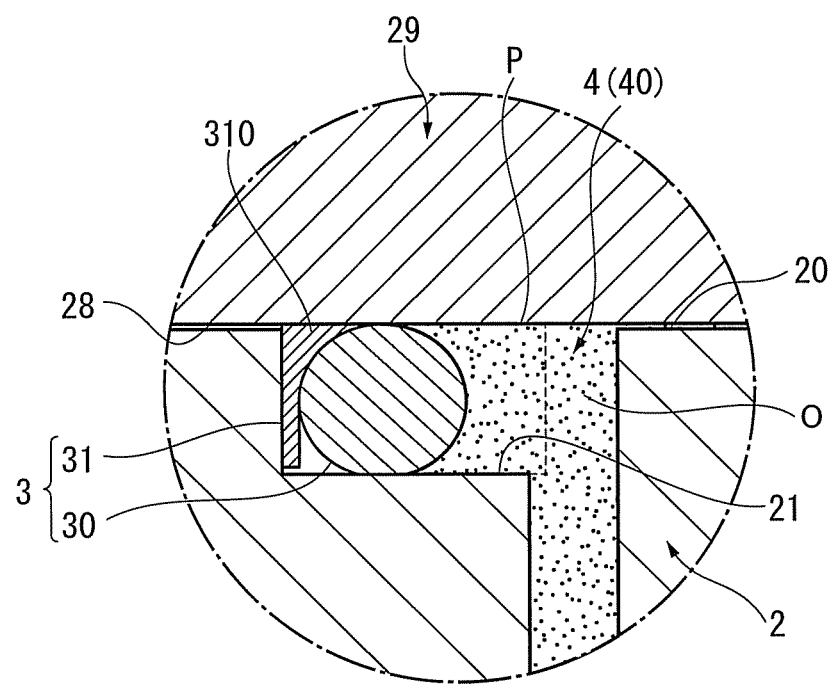

FIG. 8 is an enlarged view showing the hydrostatic pressure guide mechanism according to the first exemplary embodiment, specifically, an enlarged view of a region X2 in FIG. 7 when the guide member and the movement member are placed to face each other and oil is supplied into the static pressure pocket.

Figure 9:
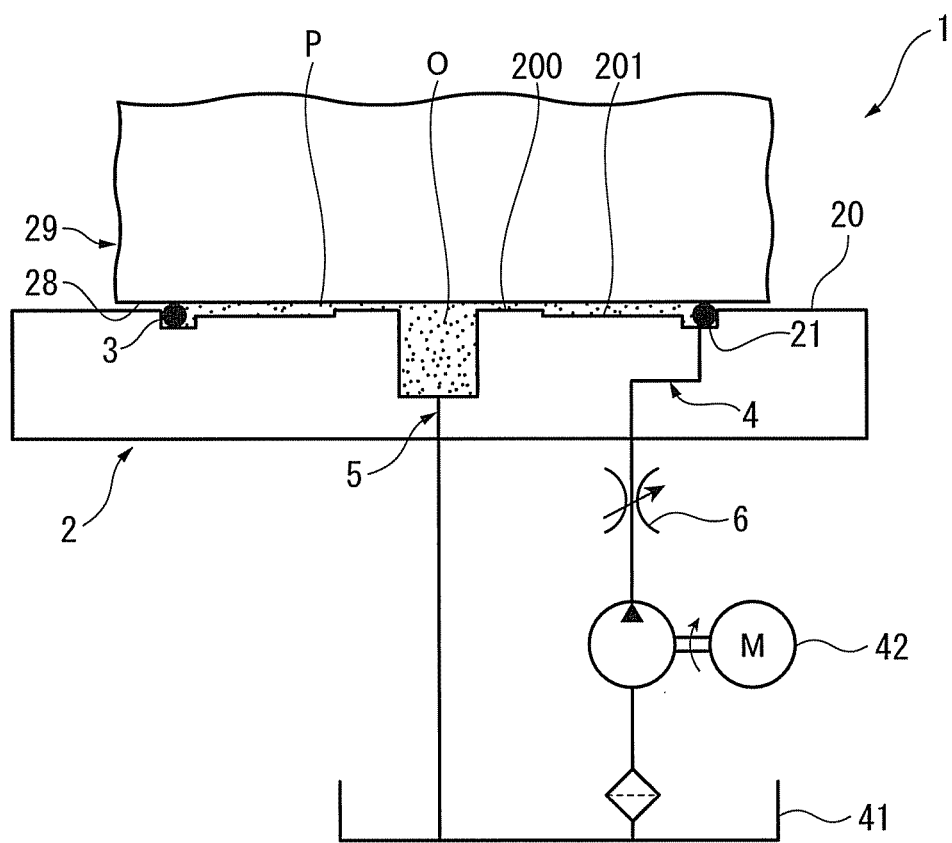

FIG. 9 schematically shows a hydrostatic pressure guide mechanism according to a second exemplary embodiment.

Figure 10:
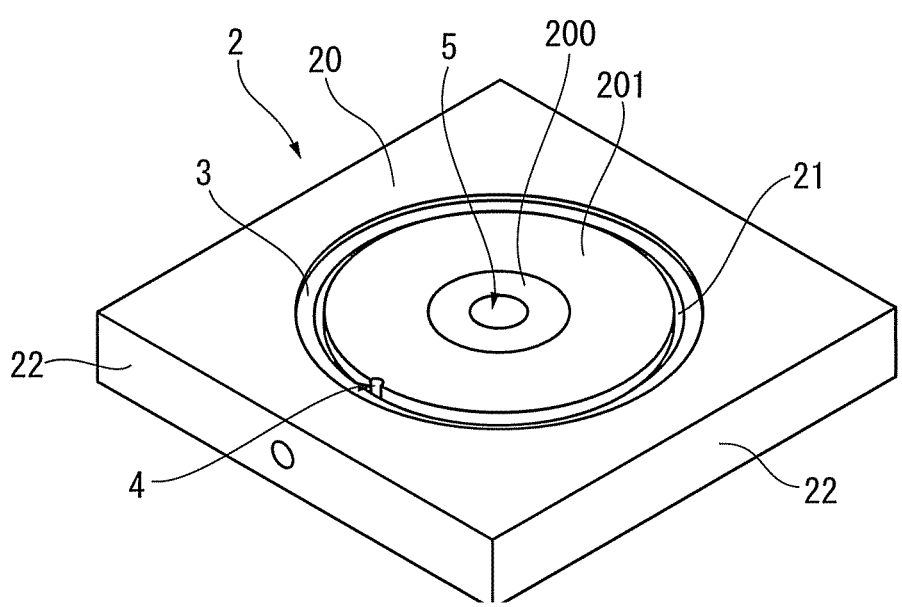

FIG. 10 is a perspective view of a movement member of a hydrostatic pressure guide mechanism according to the second exemplary embodiment.

Figure 11:
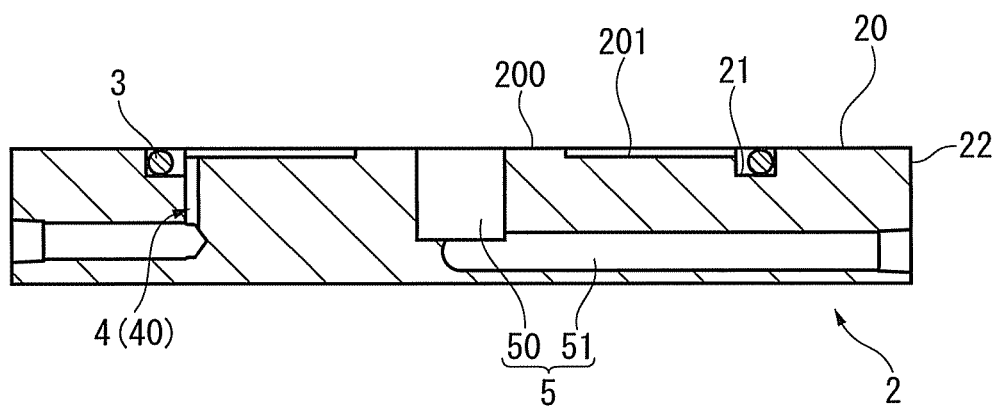

FIG. 11 is a vertically cross-sectional view of the movement member of the hydrostatic pressure guide mechanism according to the second exemplary embodiment.

Figure 12:
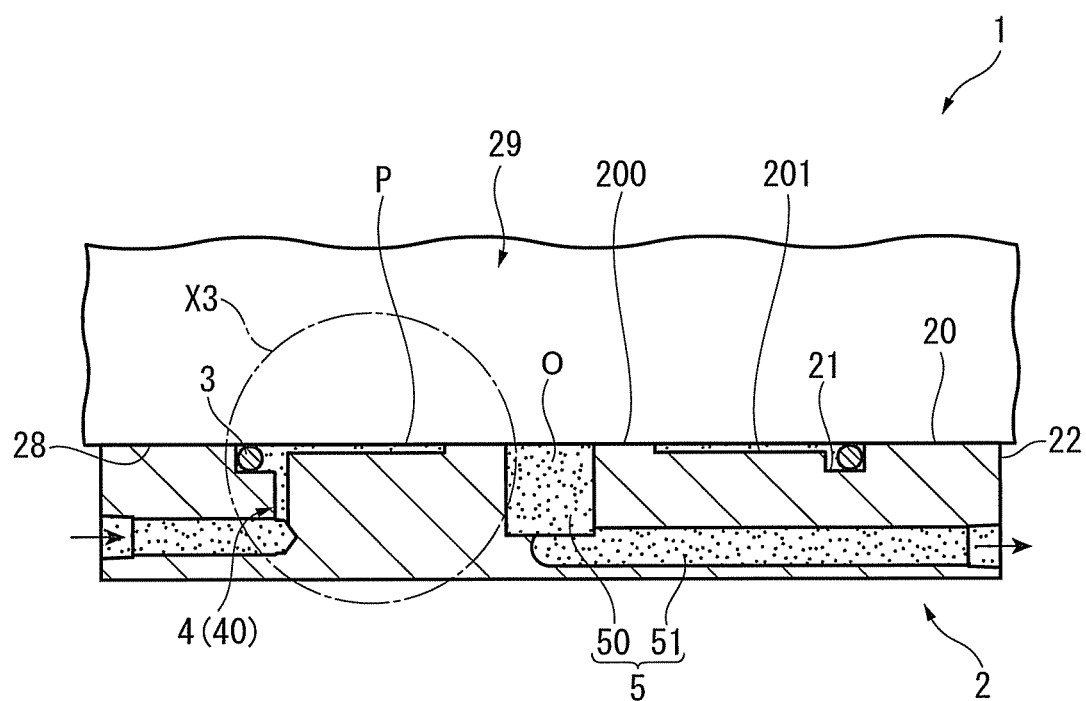

FIG. 12 shows the hydrostatic pressure guide mechanism according to the second exemplary embodiment, in which a guide member and the movement member are placed to face each other and oil is supplied into a static pressure pocket.

Figure 13:
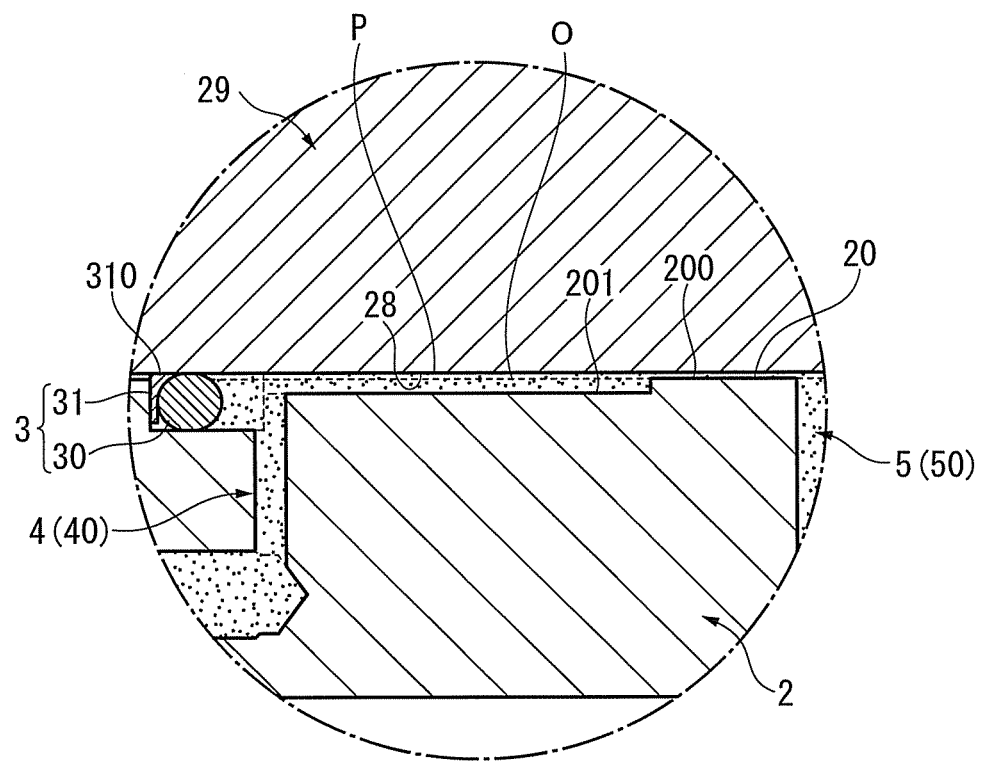

FIG. 13 is an enlarged view showing the hydrostatic pressure guide mechanism according to the second exemplary embodiment, specifically, an enlarged view of a region X3 in FIG. 12 when the guide member and the movement member are placed to face each other and oil is supplied into the static pressure pocket.

Figure 14:
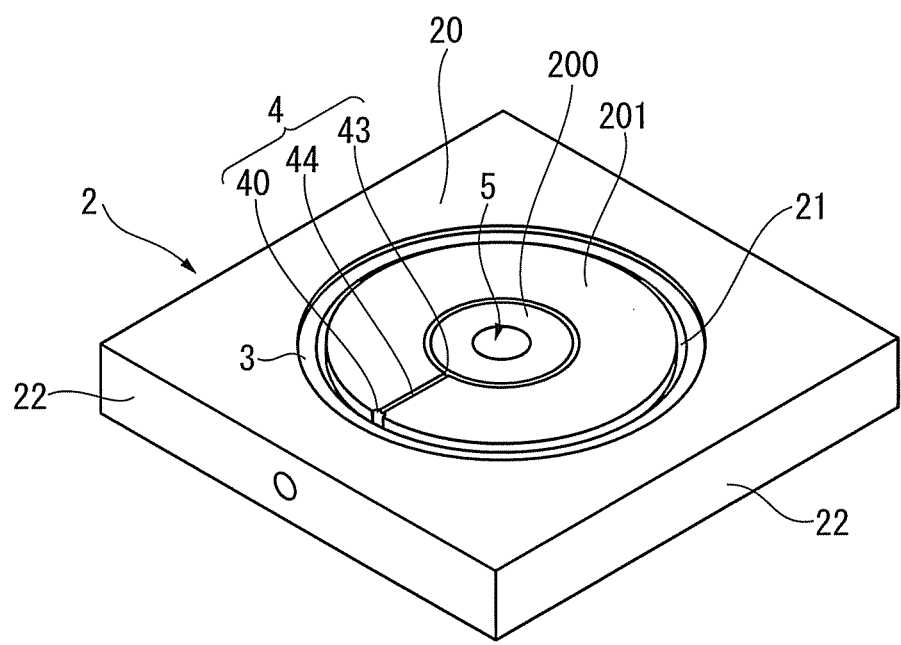

FIG. 14 is a perspective view of a movement member of a hydrostatic pressure guide mechanism according to a third exemplary embodiment.

Figure 15:
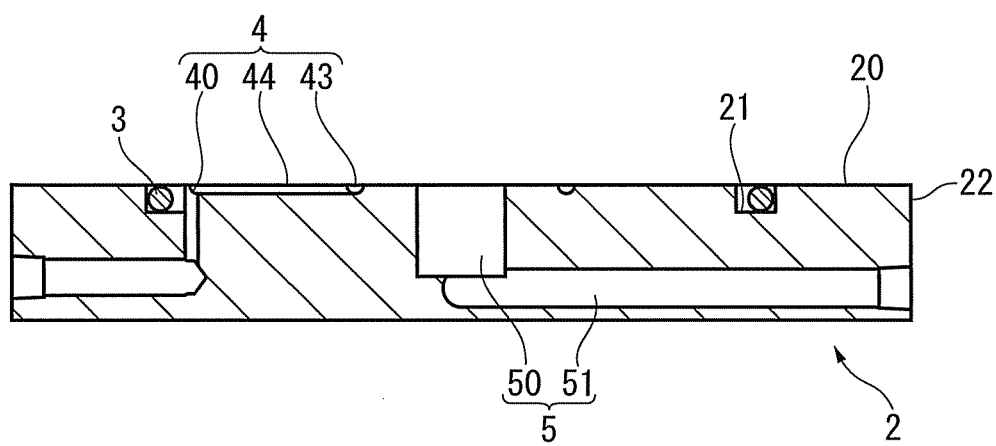

FIG. 15 is a vertically cross-sectional view of the movement member of the hydrostatic pressure guide mechanism according to the third exemplary embodiment.

Figure 16:
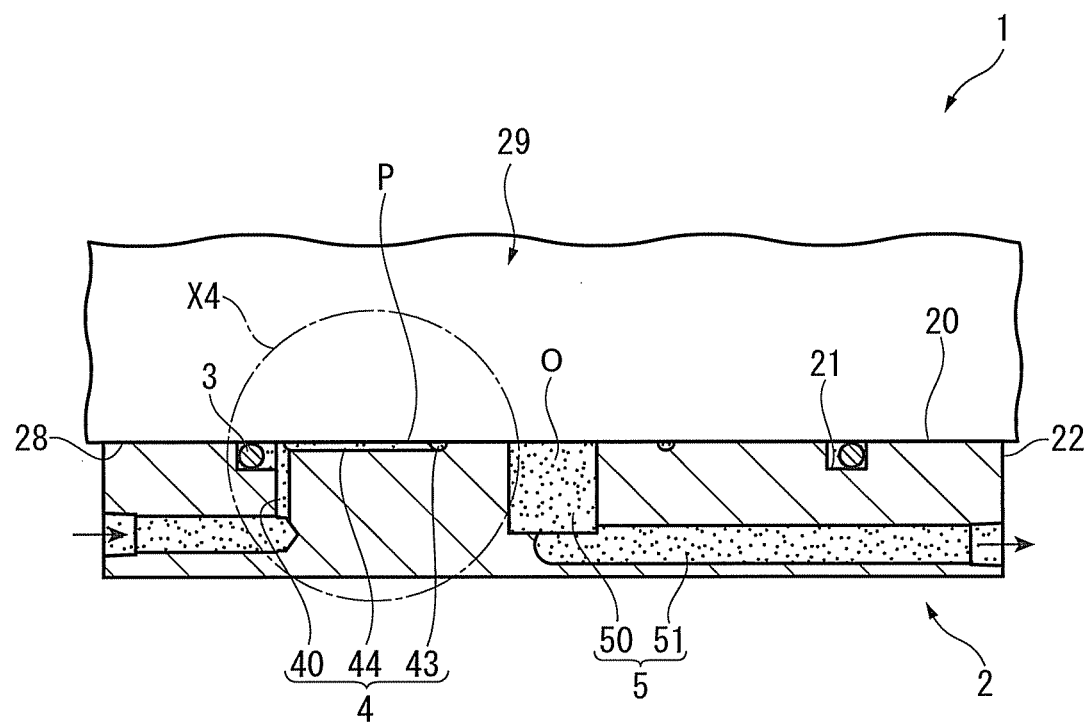

FIG. 16 shows the hydrostatic pressure guide mechanism according to the third exemplary embodiment, in which a guide member and the movement member are placed to face each other and oil is supplied into a static pressure pocket.

Figure 17:
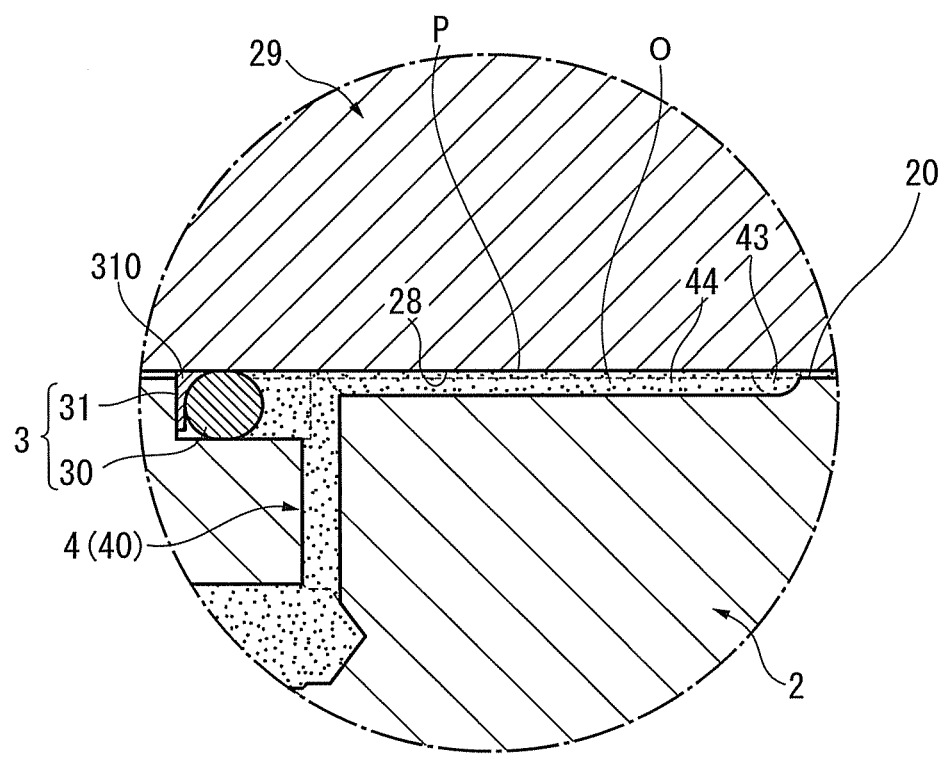

FIG. 17 is an enlarged view showing the hydrostatic pressure guide mechanism according to the third exemplary embodiment, specifically, an enlarged view of a region X4 in FIG. 16 when the guide member and the movement member are placed to face each other and oil is supplied into the static pressure pocket.

Figure 18A:
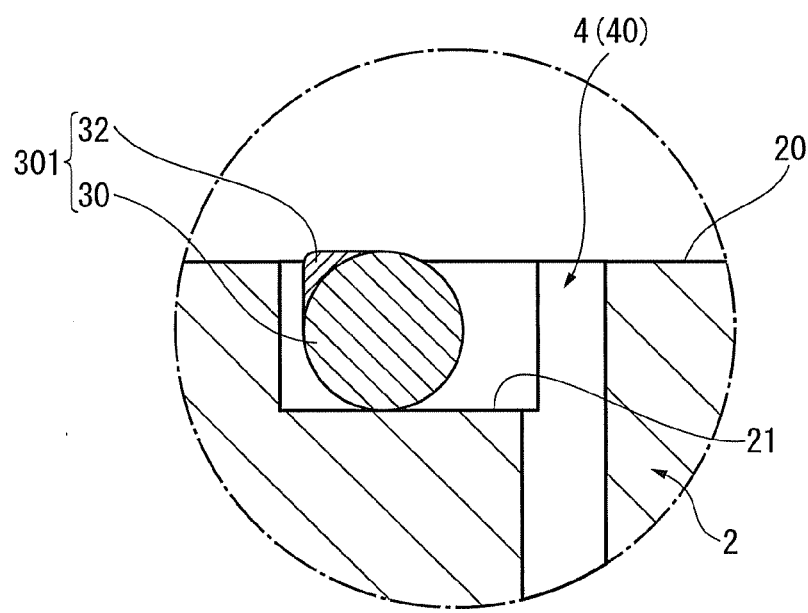

FIG. 18A shows a seal member of a hydrostatic pressure guide mechanism according to another exemplary embodiment, specifically, before a guide member and a movement member are placed to face each other.

Figure 18B:
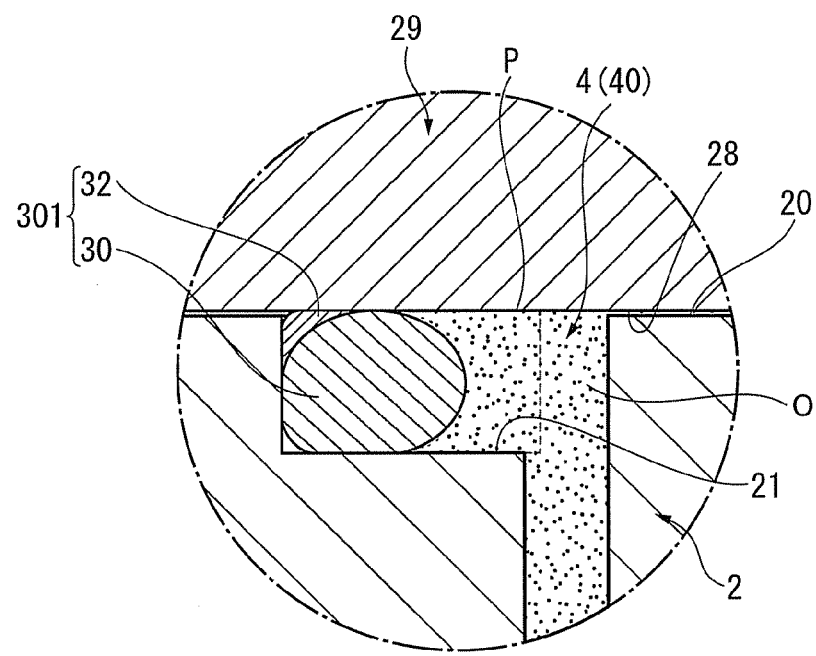

FIG. 18B shows the seal member of the hydrostatic pressure guide mechanism according to the another exemplary embodiment, in which the guide member and the movement member are placed to face each other and oil is supplied into a static pressure pocket.

Figure 19A:
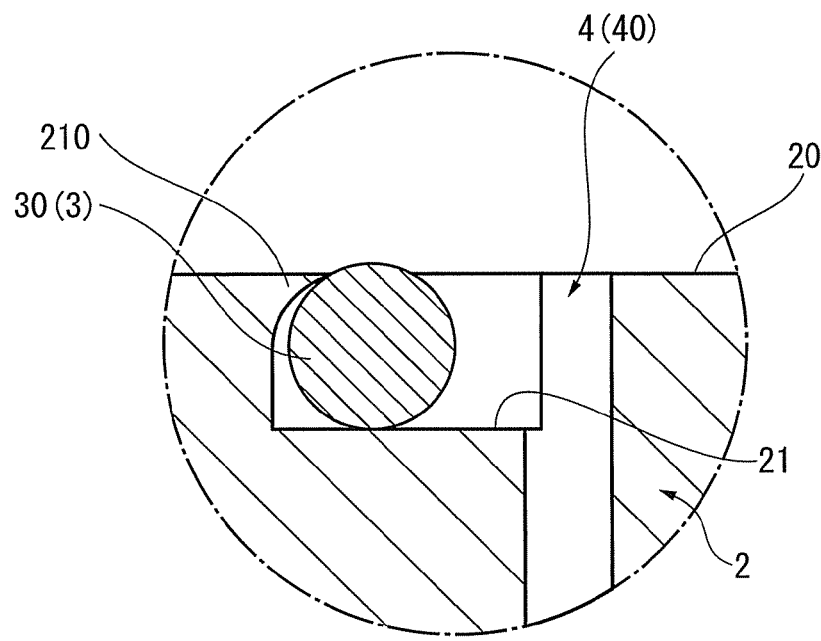

FIG. 19A shows a seal member of a hydrostatic pressure guide mechanism according to still another exemplary embodiment, specifically, before a guide member and a movement member are placed to face each other.

Figure 19B:
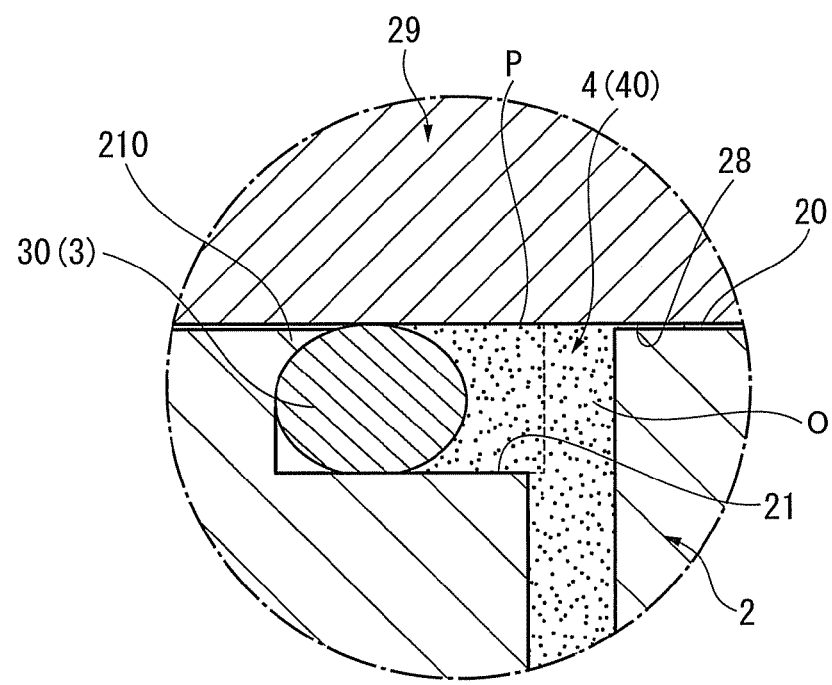

FIG. 19B shows the seal member of the hydrostatic pressure guide mechanism according to the still another exemplary embodiment, in which the guide member and the movement member are placed to face each other and oil is supplied into a static pressure pocket.

Figure 20:
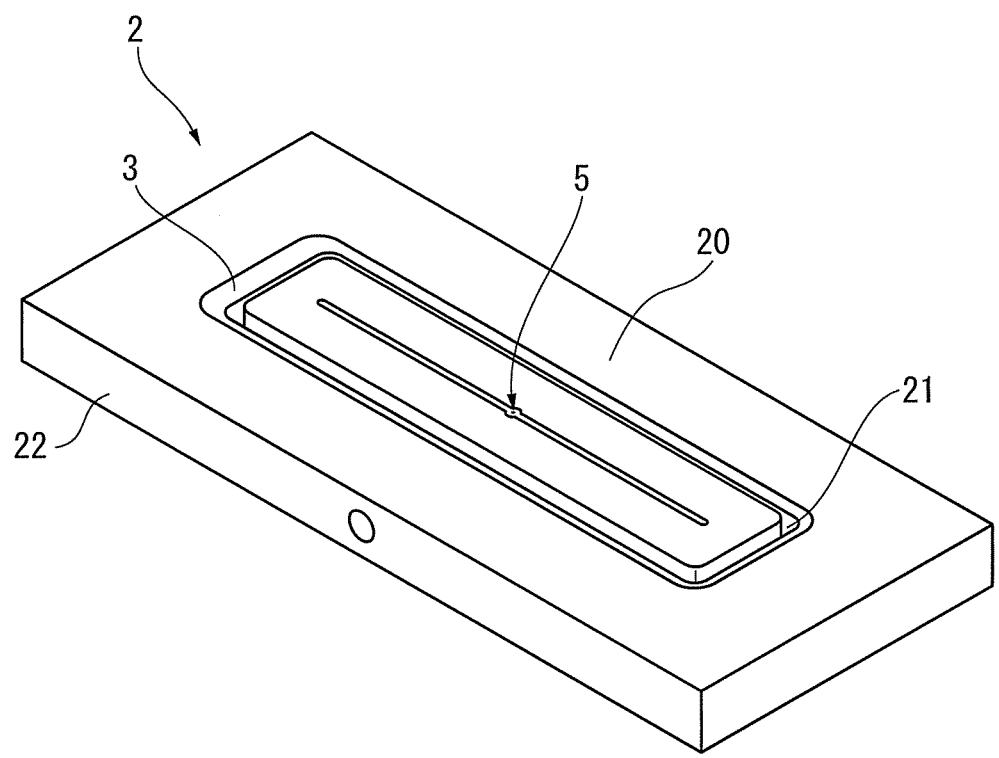

FIG. 20 is a perspective view of a movement member of a hydrostatic pressure guide mechanism according to a further exemplary embodiment.

Figure 21:
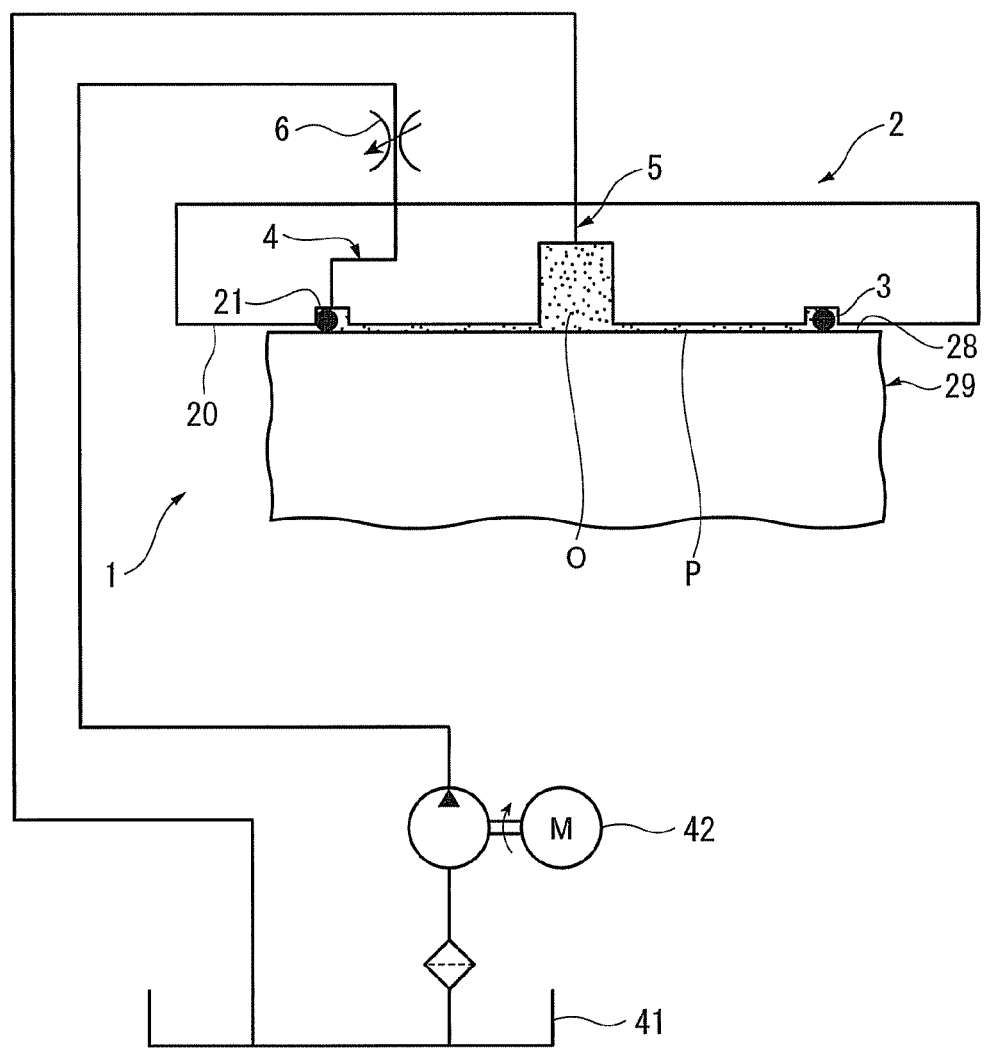

FIG. 21 schematically shows the hydrostatic pressure guide mechanism according to the further exemplary embodiment.

Figure 22:
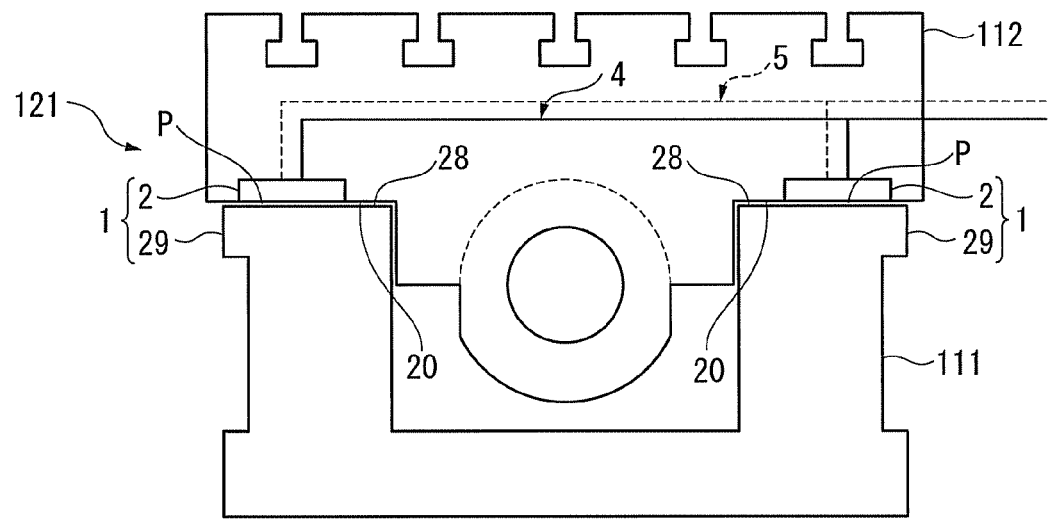

FIG. 22 is a perspective view of a hydrostatic pressure guide mechanism in a machine tool according to a still further exemplary embodiment.

Figure 23:
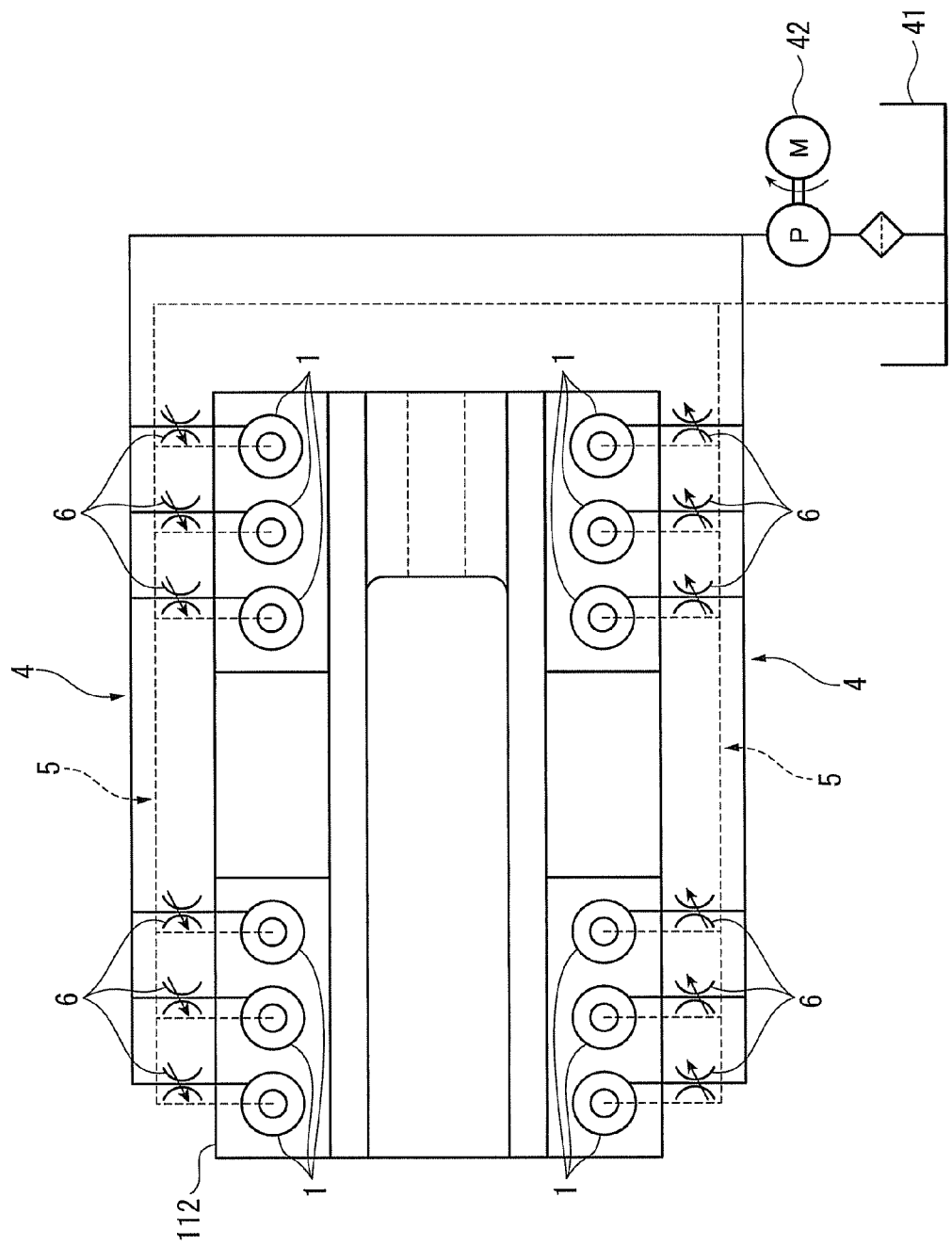

FIG. 23 schematically shows an oil supply structure and an oil recovery structure in the still further exemplary embodiment shown in FIG. 22.

Figure 24:
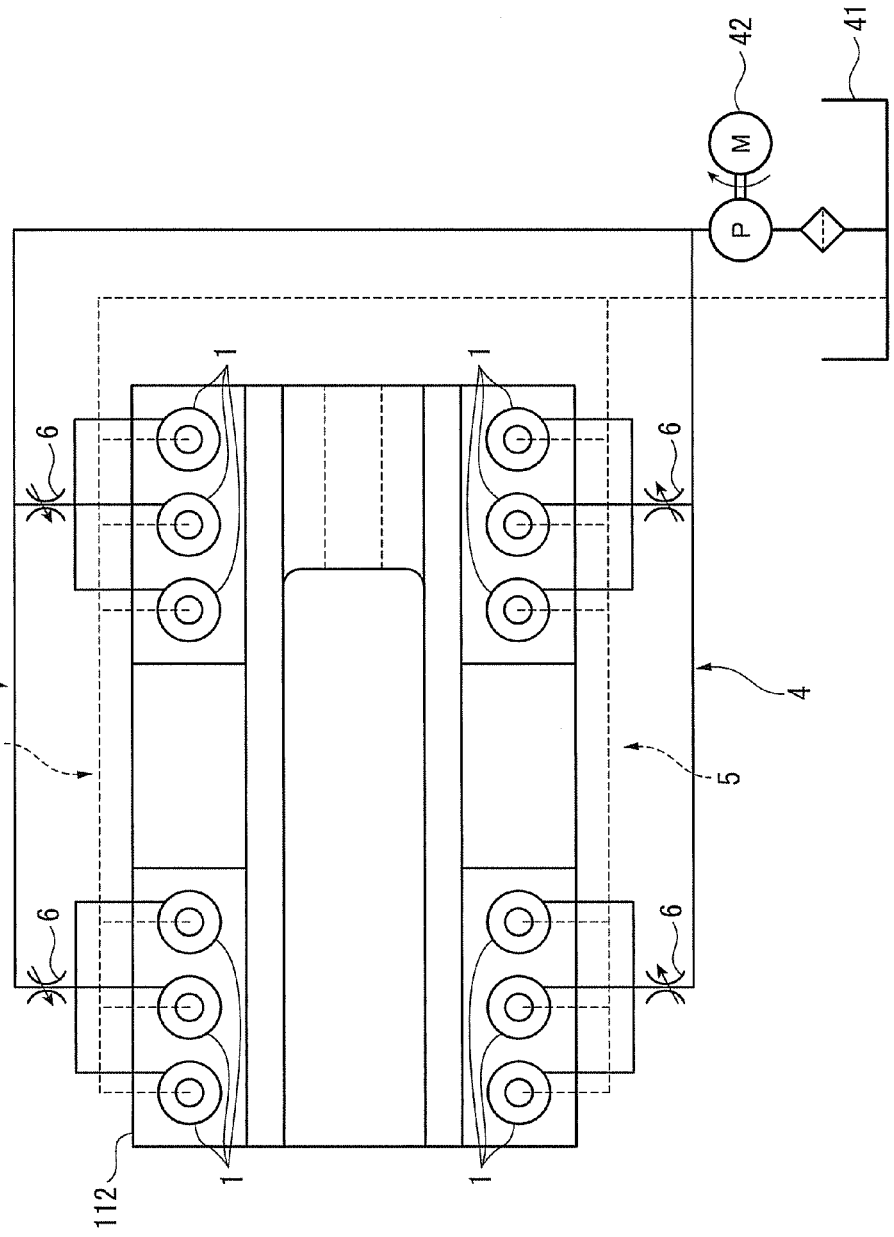

FIG. 24 schematically shows another oil supply structure and another oil recovery structure in the still further exemplary embodiment shown in FIG. 22.

Figure 25:
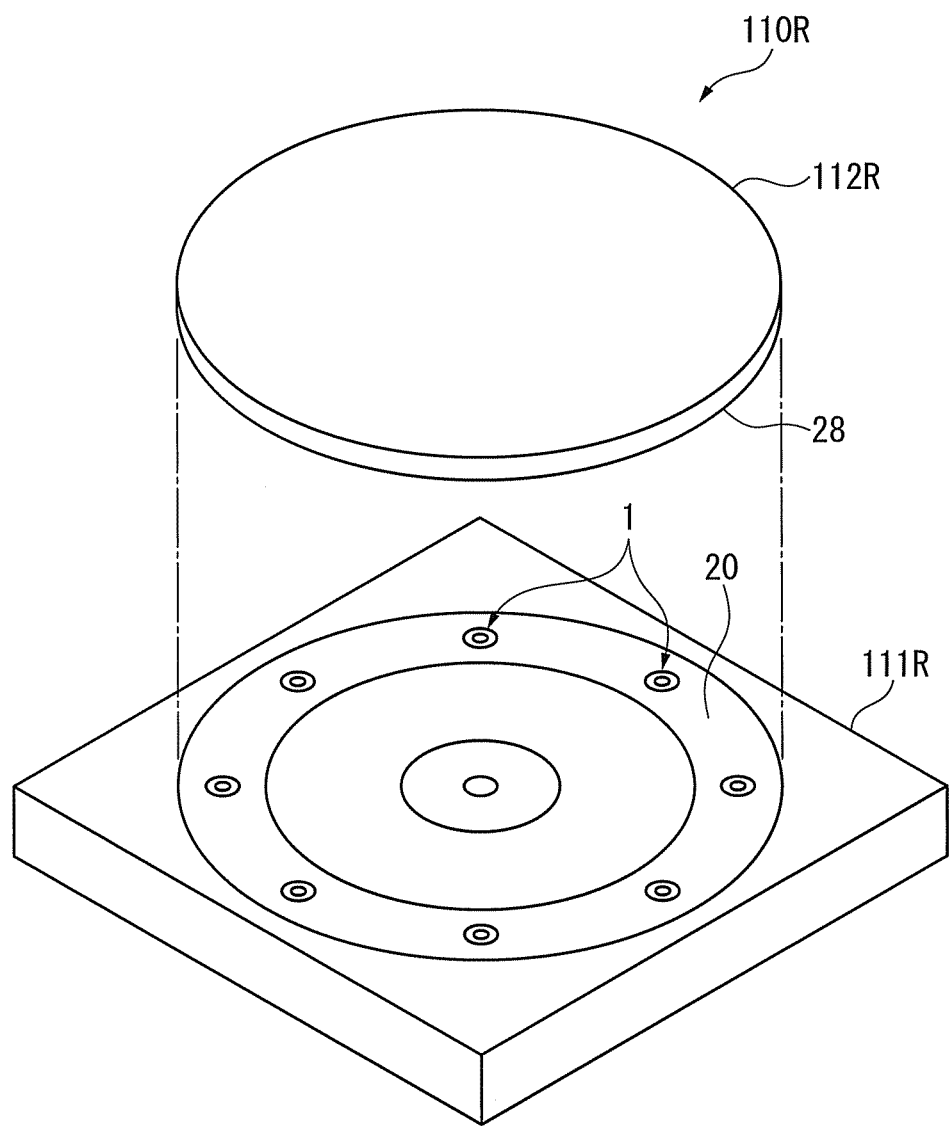

FIG. 25 is a perspective view of a hydrostatic pressure guide mechanism in a machine tool according to a still further exemplary embodiment.

Figure 26:
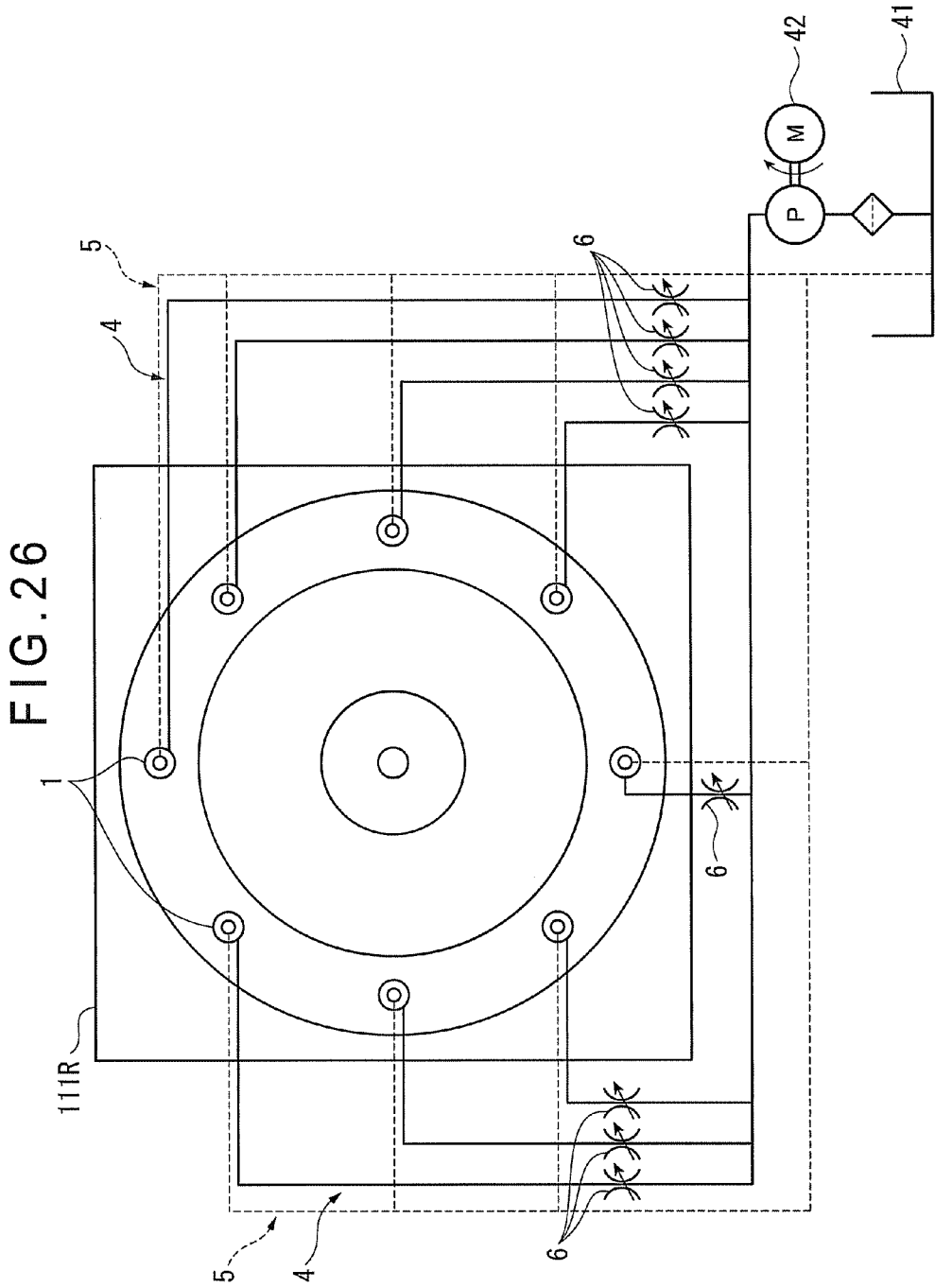

FIG. 26 schematically shows an oil supply structure and an oil recovery structure in the still further exemplary embodiment shown in FIG. 25.

Figure 27:
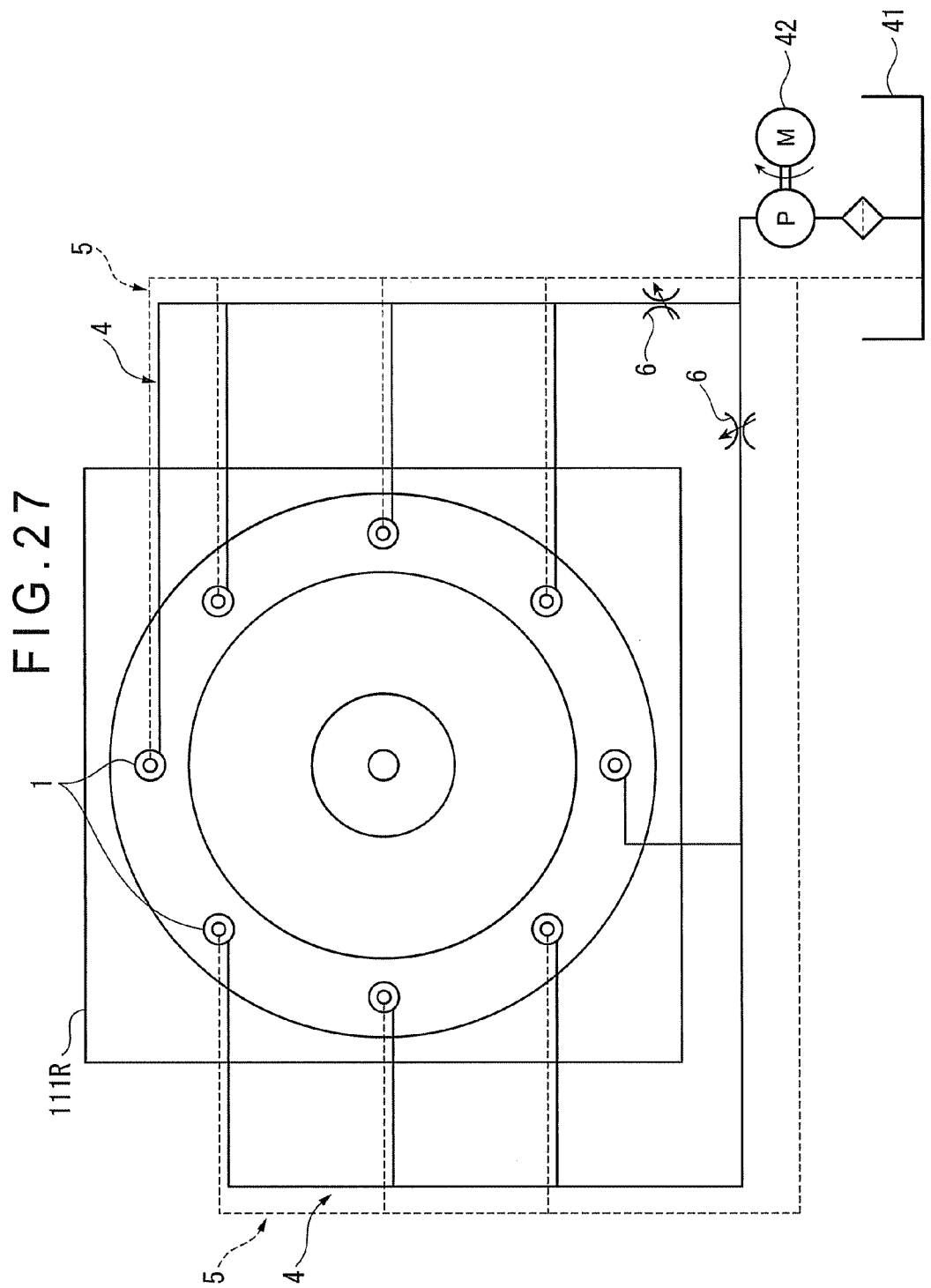

FIG. 27 schematically shows another oil supply structure and another oil recovery structure in the still further exemplary embodiment shown in FIG. 25.

Figure 28:
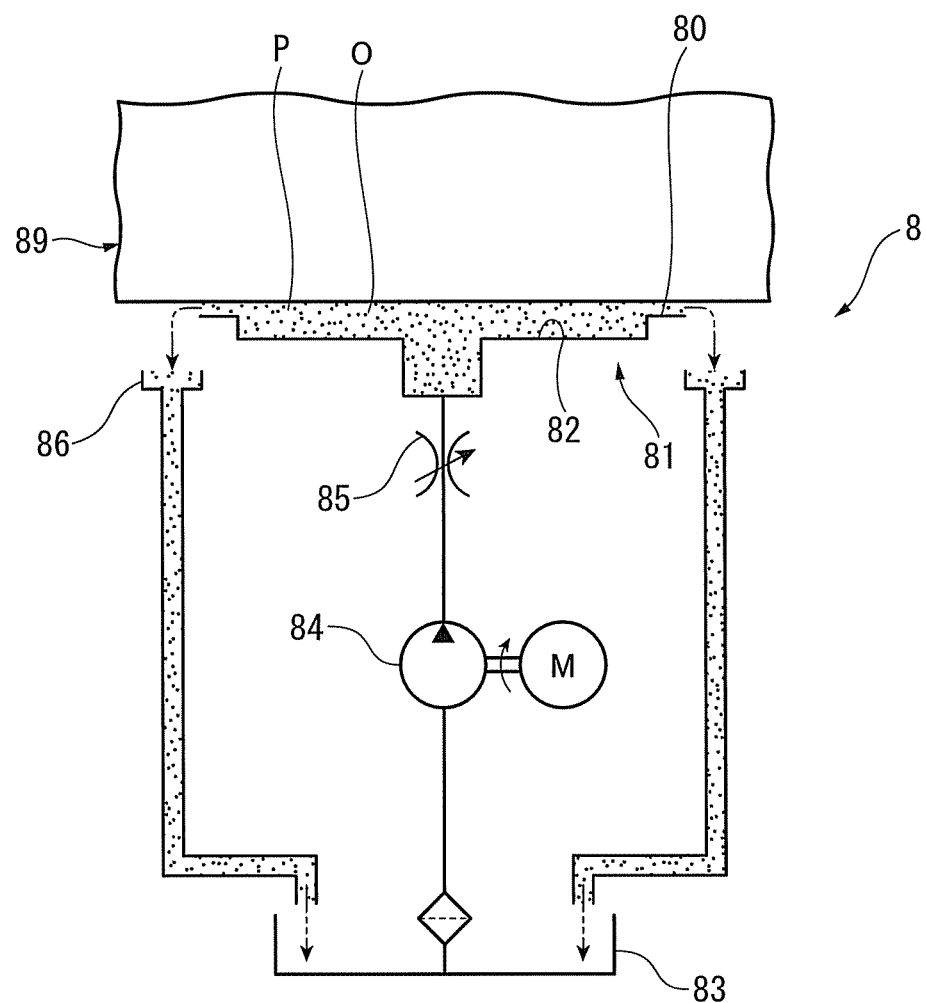

FIG. 28 schematically shows a typical hydrostatic pressure guide mechanism.

Figure 29:
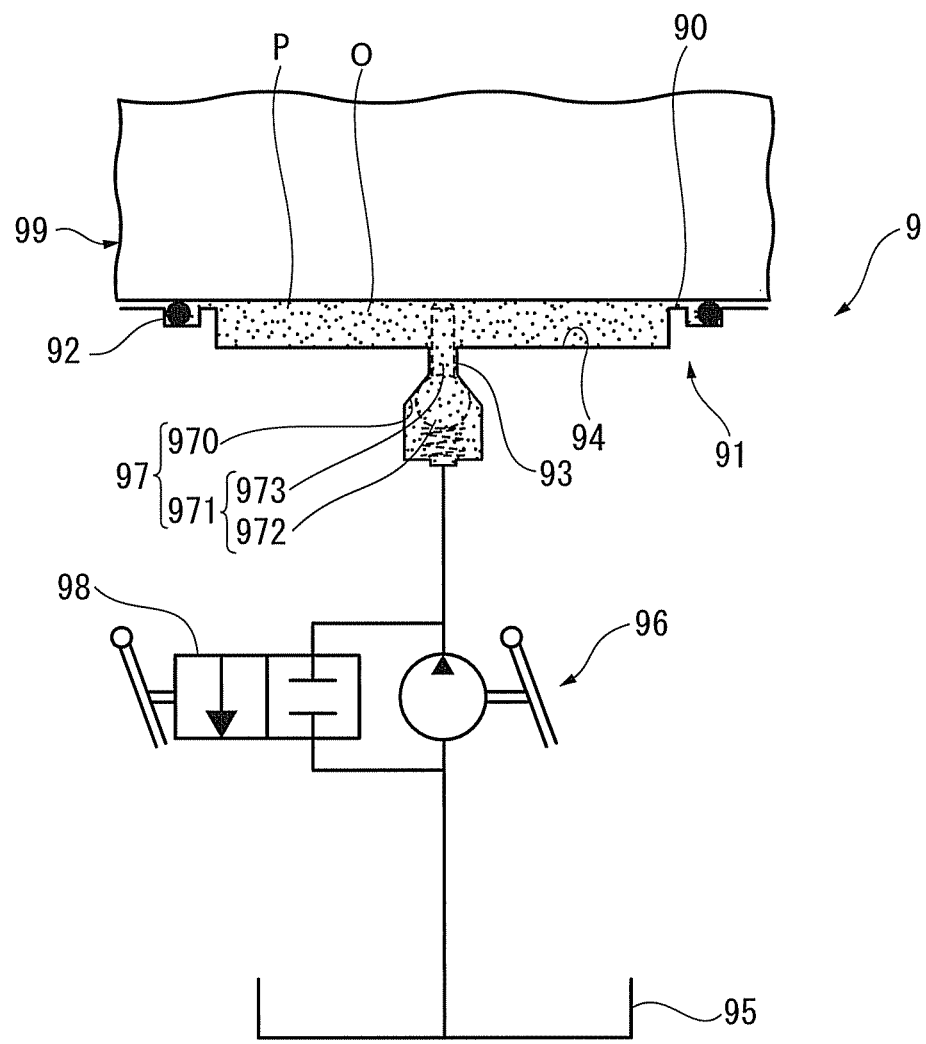

FIG. 29 schematically shows a typical heavy-weight support device.

DESCRIPTION OF EMBODIMENT(S)

A hydrostatic pressure guide mechanism according to a first exemplary embodiment of the invention will be described below with reference to the accompanying drawings.

First Exemplary Embodiment

FIGS. 1 to 8 show the first exemplary embodiment of the invention.

Figure 1:
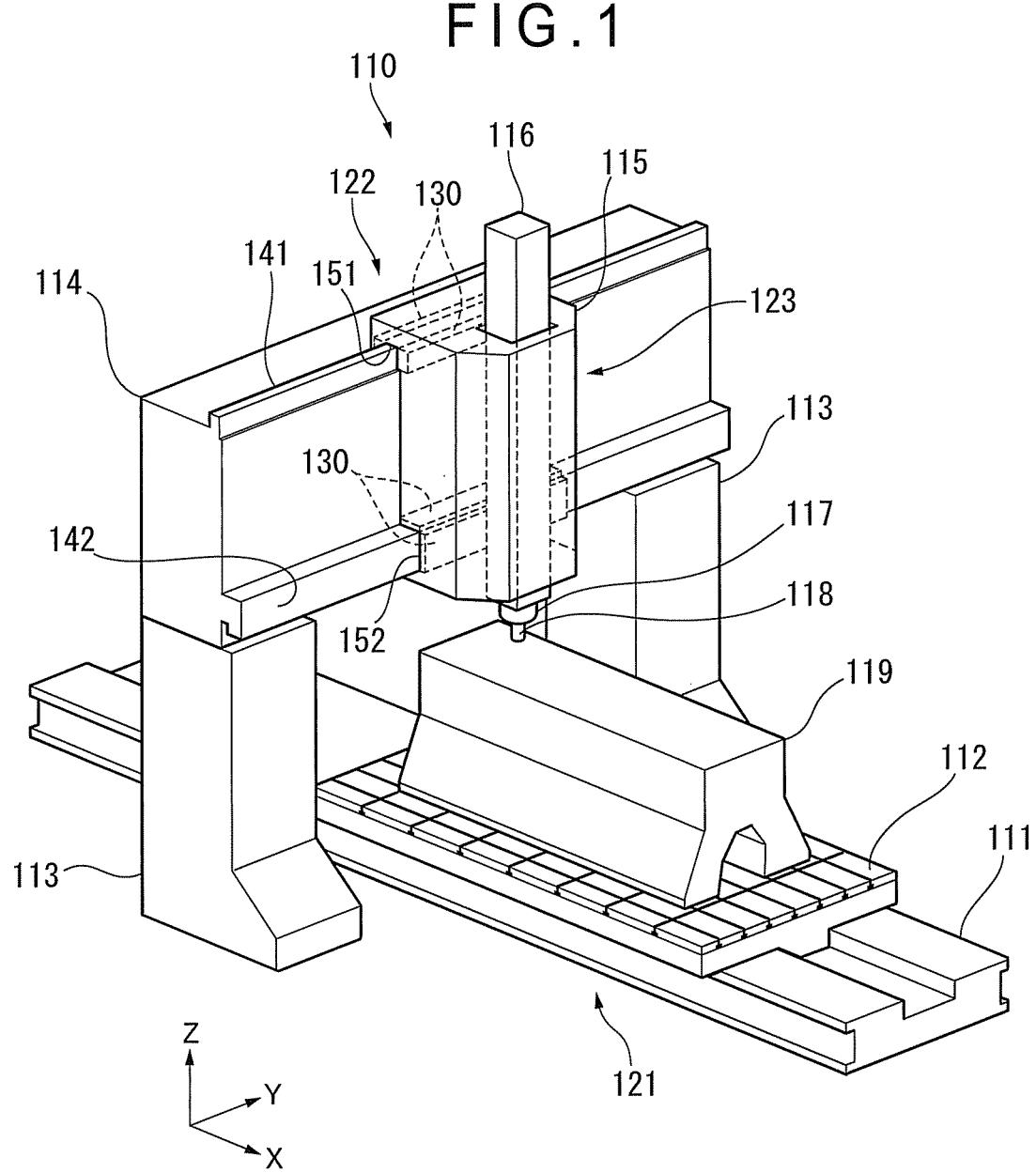
FIG. 1 is a perspective view showing a machine tool according to a first exemplary embodiment of the invention.
Figure 2:
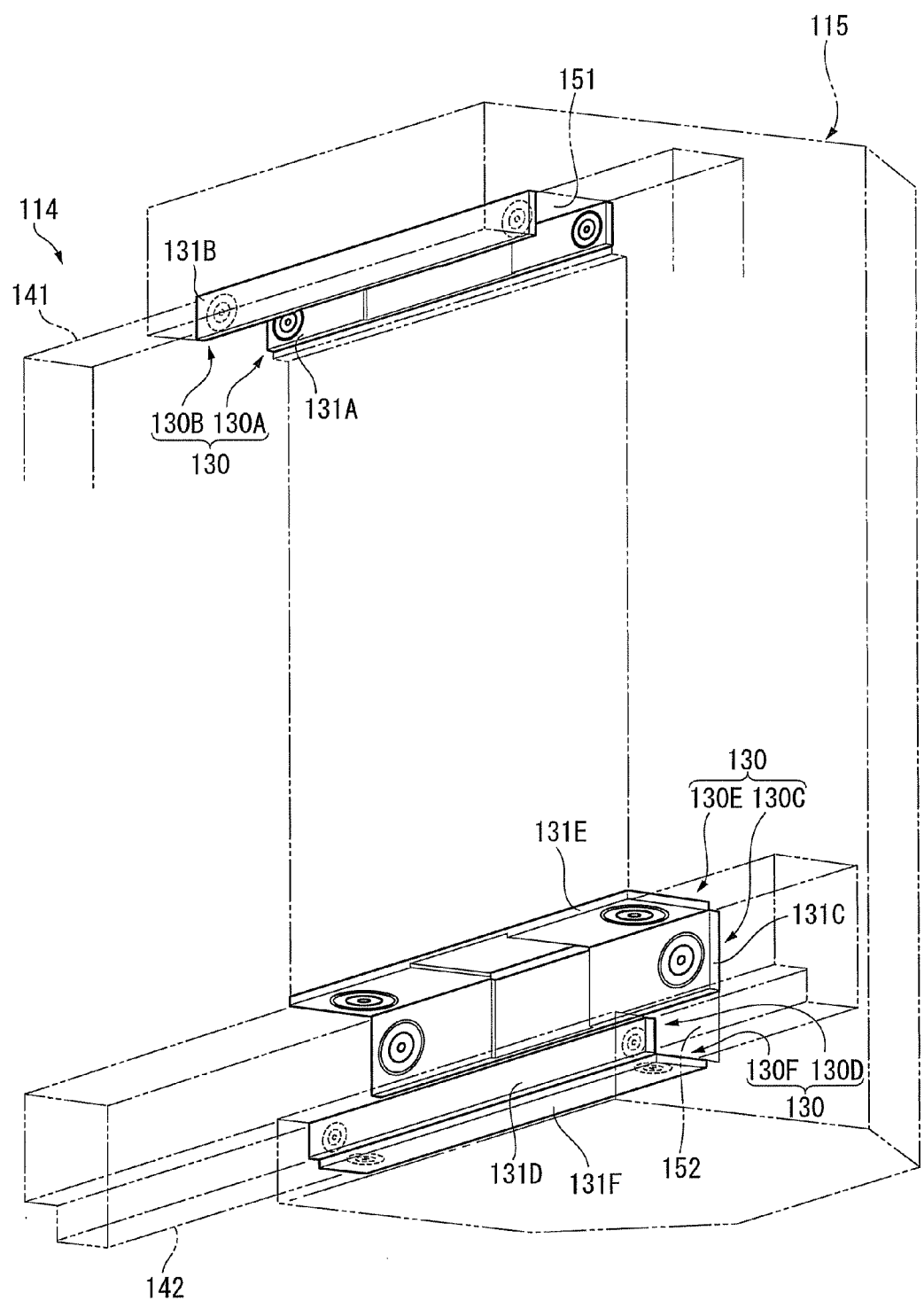
FIG. 2 is a partially-transparent perspective view showing a hydrostatic pressure guide mechanism according to the first exemplary embodiment.

In the first exemplary embodiment, a hydrostatic pressure guide mechanism is used as a guide mechanism for X-axis movement mechanism, Y-axis movement mechanism and Z-axis movement mechanism in a portal-structured machine tool 110 as shown in FIGS. 1 and 2.

As shown in FIG. 1, the machine tool 110 includes a platform 111 extending in the X-axis direction and a table 112 supported by the platform 111. A pair of columns 113 are provided on both sides of the platform 111. A cross bar 114 extends in the Y-axis direction between upper ends of the columns 113. A head 115 is supported by the cross bar 114. A ram 116 extending in the Z-axis direction (vertical direction) is attached to the head 115.

A workpiece 119, which is an object to be machined, is fixed on a top surface of the table 112. A main spindle 117 is exposed from a lower end of the ram 116. A machining tool 118 is attached to the main spindle 117.

In the machine tool 110, the tool 118 can be moved in three dimensions relatively to the workpiece 119 by moving the table 112 in the X-axis direction, moving the head 115 in the Y-axis direction, and moving the ram 116 in the Z-axis direction. With this relative movement, the workpiece 119 can be machined into any shapes.

In order to machine the workpiece in three dimensions as described above, the machine tool 110 is provided with an X-axis movement mechanism 121 for moving the table 112 along the platform 111, a Y-axis movement mechanism 122 for moving the head 115 along the cross bar 114, and a Z-axis movement mechanism 123 for moving the ram 116 relative to the head 115.

The X-axis movement mechanism 121, the Y-axis movement mechanism 122, and the Z-axis movement mechanism 123 each support a movable portion (e.g., the table 112 relative to the platform 111) in a manner to allow the movable portion to be moved, and each include a guide mechanism that guides the movable portion in a predetermined moving direction and a drive mechanism (e.g., a motor) that drives the movable portion based on an external command.

In the Y-axis movement mechanism 122 for the head 115 and the cross bar 114 among the movement mechanisms 121 to 123, a plurality of guide mechanisms 130 (see, first to sixth guide mechanisms 130A to 130F, FIG. 2) extending in the Y-axis direction are employed.

As shown in FIG. 2, the cross bar 114 includes: a first rail 141 provided to an upper portion of a side of the cross bar 114 to which the head 115 is attached; and a second rail 142 provided to a lower portion of the side of the cross bar 114 to which the head 115 is attached. The head 115 includes: a first groove 151 provided to an upper portion of the head 115 facing the cross bar 114, the first groove 151 facing downward; and a second groove 152 provided to a lower portion of the head 115 facing the cross bar 114.

The second groove 152 formed in the head 115 is engaged with the second rail 142 of the cross bar 114, thereby supporting a load applied in the Z-axis direction and restricting a position of the head 115 in the X-axis direction.

The first groove 151 formed in the head 115 is engaged with the first rail 141 of the cross bar 114, thereby restricting the position of the head 115 in the X-axis direction and restricting the head 115 from tilting due to its own weight around the second rail 142 supporting the load.

First and second movement members 131A and 131B for holding the first rail 141 therebetween in the X-axis direction are provided on an inner side of the first groove 151. Using the first rail 141 as a guide member, the first and second movement members 131A and 131B respectively provide first and second guide mechanisms 130A and 130B according to the exemplary embodiment.

On an inner side of the second groove 152, third and fourth movement members 131C and 131D are provided to hold the second rail 142 therebetween in the X-axis direction and fifth and sixth movement members 131E and 131F are provided to hold the second rail 142 therebetween in the Z-axis direction. Using the second rail 142 as a guide member, the third to sixth movement members 131C to 131F respectively provide third to sixth guide mechanisms 130C to 130F according to the exemplary embodiment.

The hydrostatic pressure guide mechanism 1 according to the exemplary embodiment shown in FIGS. 3 to 8 is used as a guide mechanism 130 (the first to sixth guide mechanisms 130A to 130F).

The hydrostatic pressure guide mechanism 1 according to the exemplary embodiment will be described in detail below.

As shown in FIG. 3 or 7, the hydrostatic pressure guide mechanism 1 according to the exemplary embodiment includes: a guide member 29 having a guide surface 28; and a movement member 2 having a slide surface 20.

As shown in FIGS. 4 and 5, the movement member 2 includes: an annular placement groove 21 formed on the slide surface 20; a seal member 3 that is an annular hermetically closing member to be disposed in the placement groove 21 and is capable of closely contacting with the guide surface 28 of the guide member 29 facing the slide surface 20; an oil supply structure 4 configured to supply the oil O to a region surrounded by the seal member 3 on the slide surface 20; an oil recovery structure 5 configured to recover the oil O from the region surrounded by the seal member 3; and a hydraulic control valve 6 (see FIG. 3) configured to adjust a pressure or a flow rate of the oil O to be supplied to the region surrounded by the seal member 3 in order to adjust the pressure of the oil O to be supplied to the region surrounded by the seal member 3 on the slide surface 20.

As shown in FIGS. 4 and 5, the movement member 2 is formed in a plate. The movement member 2 has lateral surfaces 22,22 . . . in a direction orthogonal to the slide surface 20.

FIG. 6A is an enlarged view of a region X1 in FIG. 5 before the guide member 29 and the movement member 2 are placed to face each other. FIG. 6B is an enlarged view of the region X1 in FIG. 5 when the guide member 29 and the movement member 2 are placed to face each other and the oil O is supplied in the static pressure pocket P.

The seal member 3 (hermetically closing member) is disposed in the placement groove 21 such that a part of the seal member 3 projects from the slide surface 20. More specifically, the seal member 3 includes: an annular seal member body 30; and a ring 31 disposed between the annular seal member body 30 and the placement groove 21, as shown in FIG. 6A. The seal member body 30 is elastic.

The ring 31, which is formed annular, has a concave portion formed on an inner circumference and corresponding to a profile of the seal member body 30. Moreover, the ring 31 is formed so as not to be in contact with a bottom of the placement groove 21 even when being in hermetic contact with the guide surface 28 of the guide member 29. More specifically, the ring 31 has an extension portion 310 extending inward in a radial direction. The extension portion 310 is provided along an entire circumference of the ring 31.

Accordingly, as shown in FIG. 6B, when the movement member 2 and the guide member 29 face each other to bring the slide surface 20 and the guide surface 28 into hermetic contact, the seal member 3 is pressed onto the guide surface 28 of the guide member 29. At that time, the ring 31 is in contact with the lateral surface of the placement groove 21 and further the seal member body 30 is in hermetic contact with the inner circumference of the ring 31. With this arrangement, the seal member body 30 of the seal member 3 is prevented from being broken and slipping off the placement groove 21.

In the hydrostatic pressure guide mechanism 1, a space (hereinafter, referred to as a static pressure pocket P) hermetically sealed by the slide surface 20, the guide surface 28 and the seal member 3 is defined by disposing the movement member 2 and the guide member 29 to face each other.

Referring back to FIG. 5, the oil supply structure 4 has an oil supply passage 40 that is formed in the movement member 2 and communicates with the region surrounded by the seal member 3 on the slide surface 20. Moreover, the oil supply structure 4 in the exemplary embodiment has an oil supply device 42 configured to supply the oil O in an oil tank 41 through the oil supply passage 40 to the region surrounded by the seal member 3 on the slide surface 20 (see FIG. 3).

The hydraulic control valve 6 communicates with the oil supply device 42. The pressure or the flow rate of the oil O passing through the oil supply passage 40 is adjustable using the hydraulic control valve 6. Accordingly, when the pressure or the flow rate of the oil O passing through the oil supply passage 40 is increased using the hydraulic control valve 6, the pressure of the oil O in the static pressure pocket P or a gap between the guide surface 28 and the slide surface 20 can be increased. On the other hand, when the pressure or the flow rate of the oil O passing through the oil supply passage 40 is decreased using the hydraulic control valve 6, the pressure of the oil O in the static pressure pocket P or the gap between the guide surface 28 and the slide surface 20 can be decreased. The hydraulic control valve 6 is exemplified by a throttle valve.

The oil supply passage 40 has an opening in the region surrounded by the seal member 3 on the slide surface 20. Moreover, the oil supply passage 40 also has an opening to the outside on the lateral surface 22 of the movement member 2. The oil supply device 42 is exemplified by a hydraulic pump.

The oil recovery structure 5 has a recovery hole 50 that is formed in the region surrounded by the seal member 3 on the slide surface 20 and is opened on the slide surface 20. The oil recovery structure 5 also has a recovery passage 51 communicating with the recovery hole 50.

The recovery passage 51 is formed in the movement member 2 and has a first opening communicating with the recovery hole 50 and a second opening formed on the lateral surface 22 of the movement member 2. Moreover, the recovery passage 51 communicates with the oil tank 41 of the oil supply structure 4. With this arrangement of the oil recovery structure 5, the oil O supplied in the region surrounded by the seal member 3 on the slide surface 20 can be recovered to the oil tank 41.

In the exemplary embodiment, the movement member 2 of the hydrostatic pressure guide mechanism 1 is structured as described above.

A combination of the movement member 2 and the guide member 29 provides the hydrostatic pressure guide mechanism 1.

In the hydrostatic pressure guide mechanism 1, as shown in FIG. 7 and FIG. 8 that is an enlarged view of the region X2 of FIG. 7, the movement member 2 and the guide member 29 are disposed such that the slide surface 20 of the movement member 2 faces the guide surface 28 of the guide member 29 in hermetic contact with each other. With this arrangement, the static pressure pocket P is defined by the guide surface 28 of the guide member 29, the slide surface 20 of the movement member 2 and the seal member 3.

When no oil O is supplied, the slide surface 20 is in hermetic contact with the guide surface 28 in a region of the static pressure pocket P. When the oil O is supplied from the oil supply structure 4, the supplied oil O is fed into the placement groove 21, so that the guide surface 28 in the region of the placement groove 21 is pushed up. With this operation, the guide surface 28 and the slide surface 20 are released from the hermetic contact, so that the oil O in the placement groove 21 enters a gap therebetween. The entering oil O spreads from near the placement groove 21 to an entire inside of the seal member 3 (i.e., the static pressure pocket P), whereby load transmission between the guide surface 28 and the slide surface 20 is conducted only using a static pressure of the oil O.

In this state, the guide surface 28 and the slide surface 20 are in contact only through the oil O and the seal member 3. In other words, the guide surface 28 and the slide surface 20 are not in direct contact.

For such push-up by the oil O, an area of the placement groove 21 is set such that a push-up force of the oil O supplied in the placement groove 21 exceeds the load applied to between the guide surface 28 and the slide surface 20.

The oil supply device 42 supplies the oil O into the static pressure pocket P through the oil supply passage 40 and simultaneously recovers the oil O from the static pressure pocket P through the recovery hole 50 and the recovery passage 51 into the oil tank 41. At this time, since the oil O in the static pressure pocket P is recovered in the region surrounded by the seal member 3 (i.e., in the static pressure pocket P), the oil O in the static pressure pocket P can be recovered into the oil tank 41 without being flowed to the outside.

When a pressure or an amount of the oil O supplied into the static pressure pocket P is increased, the pressure of the oil O in the static pressure pocket P is increased, in other words, the static pressure of the hydrostatic pressure mechanism that transmits load between the guide member 29 and the movement member 2 is increased. The pressure of the oil O in the static pressure pocket P is decreased from an inside of the placement groove 21 toward the recovery hole 50 and reaches zero (i.e., a relative pressure of the oil O is zero, in other words, the pressure of the oil O reaches approximately at atmospheric pressure) in a region corresponding to an edge of the recovery hole 50.

When the pressure of the oil O in the static pressure pocket P is sufficiently high, no direct contact between the slide surface 20 and the guide surface 28 is observed except for the oil O and the seal member 3, so that the hydrostatic pressure guide mechanism 1 supports the load by the static pressure and the guide member 29 and the movement member 2 can be moved with a slight force in a direction along the slide surface 20 and the guide surface 28.

At this time, when external force (external force applied in a direction intersecting with the guide surface 28 and the slide surface 20 when machining and the like are conducted with the machine tool 110 of FIG. 1) is applied to the guide member 29 and the movement member 2, the movement member 2 supports the above external force in addition to a typical load applied to between the guide member 29 and the movement member 2.

More specifically, when the external force applied to between the guide member 29 and the movement member 2 is increased, the gap between the guide surface 28 of the guide member 29 and the slide surface 20 of the movement member 2 is decreased to increase the pressure of the oil O in the static pressure pocket P.

On the other hand, when the external force applied to between the guide member 29 and the movement member 2 is decreased, the gap between the guide surface 28 of the guide member 29 and the slide surface 20 of the movement member 2 is increased to decrease the pressure of the oil O in the static pressure pocket P.

As described above, even when the external force applied to between the guide member 29 and the movement member 2 is changed, the guide member 29 and the movement member 2 can be slid by an appropriate force.

When the supply of the oil O into the static pressure pocket P is stopped, the guide member 29 and the movement member 2 remain still with the guide surface 28 and the slide surface 20 being in hermetic contact. In other words, in the region of the static pressure pocket P surrounded by the seal member 3, the pressure of the oil O intervening between the slide surface 20 and the guide surface 28 is decreased by the stop of the supply of the oil O, so that the guide member 29 and the movement member 2 are brought closer to each other by the load applied to the member 29 and the movement member 2, resulting in hermetic contact therebetween.

As described above, with the hydrostatic pressure guide mechanism 1 in the exemplary embodiment, by adjusting the pressure or the amount of the oil O supplied into the static pressure pocket P, the pressure applied to between the guide member 29 and the movement member 2 or the gap between the guide surface 28 and the slide surface 20 can be adjusted and the oil O supplied in the static pressure pocket P can be recovered without being flowed to the outside. Accordingly, such excellent advantages can be obtained that the pressure of the oil O in the static pressure pocket P or the gap between the guide surface 28 and the slide surface 20 can be adjusted depending on the states between the guide member 29 and the movement member 2, with a reduced supply amount of the oil O.

In the static pressure pocket P in the exemplary embodiment, the oil O is supplied from the oil supply structure 4 to the placement groove 21 to flow in the static pressure pocket P inward in the radial direction and is recovered through the recovery hole 50 to the oil recovery structure 5. At this time, the pressure of the oil O in the placement groove 21 is a supply pressure from the oil supply structure 4 and the relative pressure of the oil O in the region corresponding to the edge of the recovery hole 50 reaches zero (i.e., the pressure of the oil O reaches approximately atmospheric pressure). In the region of the static pressure pocket P between the placement groove 21 and the recovery hole 50, the pressure of the oil O is gradually decreased from the placement groove 21 to the recovery hole 50.

In other words, in the static pressure pocket P in the exemplary embodiment, the pressure can be naturally controlled by the decrease of the pressure in the region of the static pressure pocket P from the placement groove 21 to the recovery hole 50.

Accordingly, the hydrostatic pressure guide mechanism 1 can maintain a stable performance for a long time.

Moreover, since a movement amount between the guide member 29 and the movement member 2 (i.e., the movement amount in the direction intersecting with the slide surface 20 and the guide surface 28) can be reduced in the hydrostatic pressure guide mechanism 1, vibration transmission between the guide member 29 and the movement member 2 can be reduced, for instance, when machining is performed with the machine tool 110 shown in FIG. 1.

Second Exemplary Embodiment

FIGS. 9 to 13 show a second exemplary embodiment of the invention.

It should be noted that, in the second exemplary embodiment, a configuration identified with or corresponding to the configuration of the hydrostatic pressure guide mechanism 1 in the first exemplary embodiment will be described with the same reference numerals. Moreover, the description on the configuration in the first exemplary embodiment is occasionally incorporated herein in order to describe the configuration identified with or corresponding to the configuration in the first exemplary embodiment.

As shown in FIGS. 9 and 12, the hydrostatic pressure guide mechanism 1 in the exemplary embodiment also includes: the guide member 29 having the guide surface 28; and the movement member 2 having the slide surface 20.

As shown in FIGS. 10 and 11, the movement member 2 includes: the annular placement groove 21 formed on the slide surface 20; the seal member 3 that is an annular hermetically closing member to be disposed in the placement groove 21 and is capable of closely contacting with the guide surface 28 of the guide member 29 of the slide surface 20; the oil supply structure 4 configured to supply oil O to a region surrounded by the seal member 3 on the slide surface 20; the oil recovery structure 5 configured to recover the oil O from the region surrounded by the seal member 3; and the hydraulic control valve 6 configured to adjust a pressure or a flow rate of the oil O to be supplied to the region surrounded by the seal member 3 in order to adjust the pressure of the oil O to be supplied to the region surrounded by the seal member 3 on the slide surface 20.

The movement member 2 has the slide surface 20 in the same manner as in the first exemplary embodiment. As shown in FIGS. 10 and 11, the slide surface 20 has a pressure holding surface 200 (a land) surrounding the recovery hole 50 and a flank surface 201 (a recess) surrounding the pressure holding surface 200 in the region of the static pressure pocket P inside the seal member 3.

The pressure holding surface 200 is positioned closer to the guide member 29 than the flank surface 201 is positioned relative to the guide member 29. In other words, in the movement member 2, a height of the pressure holding surface 200 is higher than the flank surface 201 and the flank surface 201 is cut deeper than the pressure holding surface 200 relative to the surrounding slide surface 20.

Accordingly, as shown in FIGS. 9 and 12, the movement member 2 is configured such that, when the movement member 2 is placed to face the guide member 29, the gap between the pressure holding surface 200 and the guide surface 28 of the guide member 29 is smaller than a gap between the flank surface 201 and the guide member 29.

Other portions of the movement member 2, namely, the guide member 29, seal member 3, oil supply structure 4, oil recovery structure 5, and hydraulic control valve 6 have the same structures as those in the first exemplary embodiment.

In the second exemplary embodiment, the movement member 2 of the hydrostatic pressure guide mechanism 1 is structured as described above.

A combination of the movement member 2 and the guide member 29 provides the hydrostatic pressure guide mechanism 1.

In the hydrostatic pressure guide mechanism 1, as shown in FIG. 12 and FIG. 13 that is an enlarged view of the region X3 of FIG. 12, the movement member 2 and the guide member 29 are disposed such that the slide surface 20 of the movement member 2 faces the guide surface 28 of the guide member 29 in hermetic contact with each other. With this arrangement, the static pressure pocket P is defined by the guide surface 28 of the guide member 29, the slide surface 20 of the movement member 2 and the seal member 3.

The oil supply device 42 supplies the oil O into the static pressure pocket P through the oil supply passage 40 and simultaneously recovers the oil O in the static pressure pocket P through the recovery hole 50 and the recovery passage 51 into the oil tank 41. At this time, the oil O in the static pressure pocket P is recovered in the region surrounded by the seal member 3 (i.e., in the static pressure pocket P. Accordingly, the oil O in the static pressure pocket P can be recovered without being flowed to the outside Further, in the static pressure pocket P, the gap between the pressure holding surface 200 and the guide member 29 is smaller than the gap between the flank surface 201 and the guide member 29. In other words, in the static pressure pocket P, the oil O is supplied from the oil supply structure 4 to the placement groove 21 to pass through the flank surface 201 and the pressure holding surface 200 in the static pressure pocket P and is recovered through the recovery hole 50 to the oil recovery structure 5. At this time, a resistance of the oil O passing through the flank surface 201 having a large gap is small while a resistance of the oil O passing through the pressure holding surface 200 having a small gap is relatively large.

Accordingly, in a region of the static pressure pocket P corresponding to the flank surface 201, the pressure of the oil O can be kept at a predetermined pressure based on the pressure supplied from the oil supply structure 4. On the other hand, in a region of the static pressure pocket P corresponding to the pressure holding surface 200, the pressure of the oil O is gradually decreased from the predetermined pressure on the flank surface 201 toward the recovery hole 50 and reaches zero (i.e., the relative pressure of the oil O is zero, in other words, the pressure of the oil O reaches approximately at atmospheric pressure) in the region corresponding to the edge of the recovery hole 50.

Accordingly, in the second exemplary embodiment, a high pressure (static pressure) based on the pressure supplied from the oil supply structure 4 can be obtained over the region of the flank surface 201 by forming the pressure holding surface 200 (the land) and the flank surface 201 (the recess), thereby totally providing the static pressure larger than that in the arrangement of the hydrostatic pressure guide mechanism in the first exemplary embodiment in which the pressure is gradually decreased in the placement groove 21.

When the pressure of the oil O in the static pressure pocket P is sufficiently high, no direct contact between the slide surface 20 and the guide surface 28 is observed except for the oil O and the seal member 3, so that the hydrostatic pressure guide mechanism 1 supports the load by the static pressure. Accordingly, the guide member 29 and the movement member 2 can be moved with a slight force in a direction along the slide surface 20 and the guide surface 28.

At this time, when external force (external force applied in a direction intersecting with the guide surface 28 and the slide surface 20 when machining and the like are conducted with the machine tool 110 of FIG. 1) is applied to the guide member 29 and the movement member 2, the movement member 2 supports the above external force in addition to a typical load applied to between the guide member 29 and the movement member 2.

More specifically, when the external force applied to between the guide member 29 and the movement member 2 is increased, a gap between the guide surface 28 of the guide member 29 and the slide surface 20 of the movement member 2 is decreased to increase the pressure of the oil O in the static pressure pocket P.

On the other hand, when the external force applied to between the guide member 29 and the movement member 2 is decreased, the gap between the guide surface 28 of the guide member 29 and the slide surface 20 of the movement member 2 is increased to decrease the pressure of the oil O in the static pressure pocket P.

Even when the external force applied to between the guide member 29 and the movement member 2 is thus changed, the guide member 29 and the movement member 2 can be slid by an appropriate force.

When the supply of the oil O into the static pressure pocket P is stopped, the guide member 29 and the movement member 2 remains still with the guide surface 28 and the slide surface 20 in hermetic contact.

As described above, with the hydrostatic pressure guide mechanism 1 in the exemplary embodiment, by adjusting the pressure or the amount of the oil O supplied into the static pressure pocket P, the pressure applied to between the guide member 29 and the movement member 2 can be adjusted and the oil O supplied in the static pressure pocket P can be recovered without being flowed to the outside.

Accordingly, such excellent advantages can be obtained that the pressure of the oil O in the static pressure pocket P can be adjusted depending on the states between the guide member 29 and the movement member 2, with a reduced supply amount of the oil O.

Moreover, since the gap between the pressure holding surface 200 and the guide member 29 can be made smaller than the gap between the flank surface 201 and the guide member 29, while the pressure of the oil O in the region corresponding to the flank surface 201 in the static pressure pocket P is kept constant, the guide member 29 and the movement member 2 can be moved with a slight force.

Moreover, since a movement amount between the guide member 29 and the movement member 2 (i.e., the movement amount in the direction intersecting with the slide surface 20 and the guide surface 28) can be reduced in the hydrostatic pressure guide mechanism 1, vibration transmission between the guide member 29 and the movement member 2 can be reduced, for instance, when machining is performed with the machine tool 110 shown in FIG. 1.

Third Exemplary Embodiment

FIGS. 14 to 17 show a third exemplary embodiment of the invention.

It should be noted that, in the third exemplary embodiment, a configuration identified with or corresponding to the configuration of the hydrostatic pressure guide mechanism 1 in the first exemplary embodiment will be described with the same reference numerals. Moreover, the description on the configuration in the first exemplary embodiment is occasionally incorporated herein in order to describe the configuration identified with or corresponding to the configuration in the first exemplary embodiment.

As shown in FIG. 16, the hydrostatic pressure guide mechanism 1 in the third exemplary embodiment also includes: the guide member 29 having the guide surface 28; and the movement member 2 having the slide surface 20.

As shown in FIGS. 14 and 15, the movement member 2 includes: the annular placement groove 21 formed on the slide surface 20; the seal member 3 that is an annular hermetically closing member to be disposed in the placement groove 21 and is capable of closely contacting with the guide surface 28 of the guide member 29 of the slide surface 20; the oil supply structure 4 configured to supply oil O to a region surrounded by the seal member 3 on the slide surface 20; the oil recovery structure 5 configured to recover the oil O from the region surrounded by the seal member 3; and the hydraulic control valve 6 configured to adjust a pressure or a flow rate of the oil O to be supplied to the region surrounded by the seal member 3 in order to adjust the pressure of the oil O to be supplied to the region surrounded by the seal member 3 on the slide surface 20.

The oil supply structure 4 includes the oil supply passage 40, the oil tank 41 and the oil supply device 42 in the same manner as in the first exemplary embodiment.

Further, the oil supply structure 4 includes: an annular oil supply groove 43 that is provided between the oil supply passage 40 and the recovery hole 50; and a communication groove 44 communicating the oil supply passage 40 with the oil supply groove 43, in the region to be the static pressure pocket P on an inner side of the seal member 3 on the slide surface 20.

Other portions of the movement member 2, namely, the guide member 29, seal member 3, oil recovery structure 5, and hydraulic control valve 6 have the same structures as those in the first exemplary embodiment.

In the third exemplary embodiment, the movement member 2 of the hydrostatic pressure guide mechanism 1 is structured as described above.

A combination of the movement member 2 and the guide member 29 provides the hydrostatic pressure guide mechanism 1.

In the hydrostatic pressure guide mechanism 1, as shown in FIG. 16 and FIG. 17 that is an enlarged view of the region X4 of FIG. 16, the movement member 2 and the guide member 29 are disposed such that the slide surface 20 of the movement member 2 faces the guide surface 28 of the guide member 29 in hermetic contact with each other. With this arrangement, the static pressure pocket P is defined by the guide surface 28 of the guide member 29, the slide surface 20 of the movement member 2 and the seal member 3.

The oil supply device 42 supplies the oil O into the static pressure pocket P through the oil supply groove 43 and the oil supply passage 40 and simultaneously recovers the oil O in the static pressure pocket P through the recovery hole 50 and the recovery passage 51 into the oil tank 41. At this time, the oil O in the static pressure pocket P is recovered in the region surrounded by the seal member 3 (i.e., in the static pressure pocket P. Accordingly, the oil O in the static pressure pocket P can be recovered without being flowed to the outside Further, since the oil O supplied from the oil supply passage 40 is also supplied to the oil supply groove 43 through the communication groove 44, the pressure of the oil O in the region of the static pressure pocket P from the placement groove 21 to the oil supply groove 43 can be kept at a predetermined pressure based on the pressure supplied from the oil supply structure 4. On the other hand, in an inner region relative to the oil supply groove 43 in the static pressure pocket P, the pressure of the oil O is gradually decreased from the predetermined pressure based on the pressure supplied from the oil supply structure 4 in an outer region relative to the oil supply groove 43 in the static pressure pocket P toward the recovery hole 50 and reaches zero (i.e., the relative pressure of the oil O is zero, in other words, the pressure of the oil O reaches approximately at atmospheric pressure) in the region corresponding to the edge of the recovery hole 50.

Accordingly, with a simple arrangement of the communication groove 44 and the oil supply groove 43 in the third exemplary embodiment, the same functions as those of the pressure holding surface 200 (the land) and the flank surface 201 (the recess) in the second exemplary embodiment can be obtained.

When the pressure of the oil O in the static pressure pocket P is sufficiently high, no direct contact between the slide surface 20 and the guide surface 28 is observed except for the oil O and the seal member 3, so that the hydrostatic pressure guide mechanism 1 supports the load by the static pressure. Accordingly, the guide member 29 and the movement member 2 can be moved with a slight force in a direction along the slide surface 20 and the guide surface 28.

At this time, when external force (external force applied in a direction intersecting with the guide surface 28 and the slide surface 20 when machining and the like are conducted with the machine tool 110 of FIG. 1) is applied to the guide member 29 and the movement member 2, the movement member 2 supports the above external force in addition to a typical load applied to between the guide member 29 and the movement member 2.

More specifically, when the external force applied to between the guide member 29 and the movement member 2 is increased, a gap between the guide surface 28 of the guide member 29 and the slide surface 20 of the movement member 2 is decreased to increase the pressure of the oil O in the static pressure pocket P.

On the other hand, when the external force applied to between the guide member 29 and the movement member 2 is decreased, the gap between the guide surface 28 of the guide member 29 and the slide surface 20 of the movement member 2 is increased to decrease the pressure of the oil O in the static pressure pocket P.

Even when the external force applied to between the guide member 29 and the movement member 2 is thus changed, the guide member 29 and the movement member 2 can be slid by an appropriate force.

When the supply of the oil O into the static pressure pocket P is stopped, the guide member 29 and the movement member 2 remains still with the guide surface 28 and the slide surface 20 in hermetic contact.

As described above, with the hydrostatic pressure guide mechanism 1 in the exemplary embodiment, by adjusting the pressure or the amount of the oil O supplied into the static pressure pocket P, the pressure applied to between the guide member 29 and the movement member 2 can be adjusted and the oil O supplied in the static pressure pocket P can be recovered without being flowed to the outside. Accordingly, such excellent advantages can be obtained that the pressure of the oil O can be adjusted depending on the states between the guide member 29 and the movement member 2, with a reduced supply amount of the oil O.

Moreover, since the oil supply structure 4 includes the oil supply groove 43, while the pressure of the oil O in the region from the placement groove 21 to the oil supply groove 43 in the static pressure pocket P is kept constant, the guide member 29 and the movement member 2 can be moved with a slight force.

Moreover, since a movement amount between the guide member 29 and the movement member 2 (i.e., the movement amount in the direction intersecting with the slide surface 20 and the guide surface 28) can be reduced in the hydrostatic pressure guide mechanism 1, vibration transmission between the guide member 29 and the movement member 2 can be reduced, for instance, when machining is performed with the machine tool 110 shown in FIG. 1.

Other Exemplary Embodiment

It should be noted that the invention is not limited to the above-described embodiments, but includes modifications and improvements as long as such modifications and improvements are compatible with an object of the invention.

In the first, second and third exemplary embodiments, the seal member 3 is disposed in the placement groove 21 such that a part of the seal member 3 projects from the slide surface 20. However, the arrangement of the seal member 3 is not limited thereto.

For instance, the seal member 3 may be disposed in the placement groove 21 such that a part of the seal member 3 is projectable from the slide surface 20.

More specifically, the seal member 3 may be disposed such that the part of the seal member 3 projects from the slide surface 20 when seal member 3 is pressed by the oil O supplied to the placement groove 21 to be pushed toward the guide member 29.

Moreover, in the first, second and third exemplary embodiments, the seal member 3 includes: the annular seal member body 30; and the ring 31 disposed between the seal member body 30 and the placement groove 21. However, the arrangement of the seal member 3 is not limited thereto.

For instance, as shown in FIG. 18A, a seal member 301 may include: the annular seal member body 30; and a hardened portion 32 that is integrally formed with the seal member body 30 to define an outer-circumferential upper-edge of the seal member body 30.

In this arrangement, as shown in FIG. 18B, when the movement member 2 and the guide member 29 are disposed to face each other, the seal member body 30 and the hardened portion 32 are pressed by the guide member 29. According to this operation, the hardened portion 32 of the seal member 301 is brought into hermetic contact with a portion (an outer lateral surface of the placement groove 21) defining the oil supply passage 40 of the movement member 2, so that the seal member 301 is prevented from slipping off the oil supply passage 40 even when the oil O is supplied in the static pressure pocket P.

The hardened portion 32 of the seal member 301 can be formed, for instance, by forming the seal member body 30 from synthetic rubber, and vulcanizing the outer-circumferential upper-edge of the seal member body 30 or inserting a glass fiber and partially reinforcing the seal member body 30 when molding the seal member body 30.

Alternatively, the seal member 3 may be provided by: separately forming the seal member body 30 and the hardened portion 32 using different materials; and subsequently integrating the seal member body 30 with the hardened portion 32 using an adhesive material (e.g., various high polymer adhesive materials such as a rubber adhesive agent) and the like. In this arrangement, as the material for the hardened portion 32, fluorine-based materials such as Teflon (registered trademark), high polymer materials such as various plastic materials, metallic materials such as gunmetal, and the like are usable.

Further alternatively, the seal member 3 is formable only with the seal member body 30.

In this arrangement, as shown in FIG. 19A, it is preferable to provide a projection 210 extending inward in the radial direction of the placement groove 21 to the portion defining the placement groove 21 (on an outer circumference of the placement groove 21) of the movement member 2.

With this arrangement, as shown in FIG. 19B, when the movement member 2 and the guide member 29 are disposed to face each other, the projection 210 can prevent the seal member 3 from slipping off the placement groove 21.

In the first, second and third exemplary embodiments, the seal member 3 is provided by separate components of the seal member body 30 and the ring 31. However, the arrangement of the seal member 3 is not limited thereto.

For instance, the seal member body 30 and the ring 31 may be formed integrally, for instance, by attaching the ring 31 to the seal member body 30.

In the first, second and third exemplary embodiments, the movement member 2 is formed in a square shape in a plan view and includes a circular hydrostatic structure within the seal member 3. However, the arrangement of the seal member 3 is not limited thereto.

For instance, as shown in FIG. 20, the movement member 2 may be formed in a rectangular shape in a plan view.

In the first, second and third exemplary embodiments, when the movement member 2 is formed in a rectangular shape in a plan view, the oil supply passage 40 may include a circular groove formed on the slide surface 20.

In this arrangement, the circular groove formed on the slide surface 20 may be formed in a circle, ellipse, rectangle or rectangle with rounded corners in a plan view. In this arrangement, the oil recovery structure 5 may be formed to include a groove extending in a longitudinal direction of the movement member 2, in which the recovery hole 50 is provided to be open on the groove.

Further, in this arrangement, a plurality of recovery holes 50 may be provided in the longitudinal direction of the movement member 2.

In the first, second and third exemplary embodiments, the movement member 2 is provided with the slide surface 20 facing upward. The guide member 29 is placed on the movement member 2 with the guide surface 28 facing downward. On the slide surface 20 facing upward, the seal member 3, the oil supply structure 4 and the oil recovery structure 5 are provided, whereby a static pressure pocket is formed between the slide surface 20 and the guide surface 28. The hydrostatic pressure guide mechanism 1 in this layout is usable as a sixth guide mechanism 130F in FIG. 2.

However, the layout of the movement member 2 and the guide member 29 is not limited thereto. For instance, the movement member 2 and the guide member 29 may be disposed in a vertically reversed order, or alternatively, may be disposed side by side to face each other.

For instance, as shown in FIG. 21, the guide member 29 may be placed with the guide surface 28 facing upward. The movement member 2 may be placed on the guide member 29 with the slide surface 20 facing downward. On the slide surface 20 facing downward, the seal member 3, the oil supply structure 4 and the oil recovery structure 5 may be provided, whereby a static pressure pocket is formed between the slide surface 20 and the guide surface 28.

The hydrostatic pressure guide mechanism 1 with this arrangement is usable as a fifth guide mechanism 130E in FIG. 2.

Alternatively, the guide surface 28 and the slide surface 20 are not necessarily provided in a horizontal layout, but may be provided in a vertical layout.

The hydrostatic pressure guide mechanism 1 with this arrangement is usable as first to fourth guide mechanisms 130A, 130B, 130C and 130D in FIG. 2.

It should be noted that it is necessary that a predetermined transmission load (preload) is applied onto the oil O in the static pressure pocket P in order to obtain a static pressure guide function in the hydrostatic pressure guide mechanism 1.

When the guide surface 28 and the slide surface 20 are in a vertical layout as shown in the first to fourth guide mechanisms 130A, 130B, 130C and 130D in FIG. 2, a pair of guide mechanisms are disposed to face each other in order to obtain the above-described transmission load. For this reason, as shown in FIG. 2, the first and second guide mechanisms 130A and 130B are disposed as a pair to face each other while the third and fourth guide mechanisms 130C and 130D are disposed as a pair to face each other.

In the fifth guide mechanism 130E in FIG. 2, since the weight of the head 115 is applied downward, the transmission load can be obtained even only by the head 115. Accordingly, when a guide mechanism is disposed at a portion mainly receiving the weight, as shown in the arrangement of the fifth guide mechanism 130E, a pair of guide mechanisms are not necessarily required.

Moreover, when the guide mechanism is disposed at a portion to which moment is applied, as shown in a cantilevered structure, even in a vertical layout of the guide surface 28 and the slide surface 20, a pair of guide mechanisms are not necessarily required.

It is only required that a size of the static pressure pocket P in the hydrostatic pressure guide mechanism 1 is determined depending on the load applied thereto. For instance, when the static pressure pocket P is used at a portion to which a large load is applied, it is desirable to provide a large diameter of the static pressure pocket P or increase the number of the static pressure pocket P. For instance, the third and fifth guide mechanisms 130C and 130E shown in FIG. 2 have a static pressure pocket with a larger diameter than that of other static pressure pockets. Such a setting is desirably determined as needed depending on a device where the static pressure pocket is applied Further, the hydrostatic pressure guide mechanism 1 according to the exemplary embodiment may be applied not only to the Y-axis movement mechanism 122 that relatively moves the cross bar 114 and the head 115 of the machine tool 110 in FIG. 1 but also to other relatively movable portions of the machine tool 110, for instance, to a guide mechanism of the Z-axis movement mechanism 123 that relatively moves the head 115 and the ram 116 or to a guide mechanism of the X-axis movement mechanism 121 that relatively moves the platform 111 and the table 112.

As shown in FIG. 22, the hydrostatic pressure guide mechanism 1 according to the exemplary embodiment is provided between the platform 111 and the table 112 as a guide mechanism of the X-axis movement mechanism 121.

The hydrostatic pressure guide mechanism 1 includes: the guide member 29 having the guide surface 28 defined by an upper surface of the platform 111; and the movement member 2 having the slide surface 20 defined by a lower surface of the table 112. The hydrostatic pressure guide mechanism 1 includes the oil supply structure 4 and the oil recovery structure 5 near the table 112 and can form the static pressure pocket P on an inner side of the seal portion provided to the slide surface 20.

Since the weight of the table 112 is applied to the hydrostatic pressure guide mechanism 1 as the load applied downward, the hydrostatic pressure guide mechanism 1 is not provided in a pair.

As shown in FIG. 23, a plurality of hydrostatic pressure guide mechanisms 1 are provided on a lower surface of the table 112. Specifically, three hydrostatic pressure guide mechanisms 1 are provided at each of four corners (total four positions on both sides of both ends in a moving direction) of the lower surface of the table 112.

The oil supply structure 4 and the oil recovery structure 5 are connected to each of the hydrostatic pressure guide mechanisms 1. Two systems of the oil supply structures 4 and the oil recovery structure 5 on both ends of a first side of the table 112 are grouped into a first system. Two systems of the oil supply structures 4 and the oil recovery structure 5 on both ends of a second side of the table 112 are grouped into a second system. The first system and the second system are further grouped into one system. The system finally grouped is connected to the common oil tank 41 and oil supply device 42.

The hydraulic control valve 6 is provided to the oil supply structure 4 in each of the hydrostatic pressure guide mechanisms 1.

In the exemplary embodiment, the hydrostatic pressure guide mechanism 1 can function as a guide mechanism of the X-axis movement mechanism 121, so that the above-described advantages caused by the hydrostatic pressure guide mechanism 1 can be obtained. Further, since the oil supply structure 4 and the oil recovery structure 5 are used in common in the plurality of hydrostatic pressure guide mechanisms 1, the arrangement of the device can be simplified. Since the hydraulic control valve 6 is provided to each of the hydrostatic pressure guide mechanisms 1, each of the hydrostatic pressure guide mechanisms 1 is minutely controllable with the hydraulic control valve 6 while the oil supply structure 4 and the oil recovery structure 5 can be used in common.

It should be noted that, when the oil supply structure 4 and the oil recovery structure 5 are used in common, the hydraulic control valve 6 may be provided to each of the systems instead of being provided to each of the hydrostatic pressure guide mechanisms 1.

In FIG. 24, basic structures of the hydrostatic pressure guide mechanism 1, the oil supply structure 4 and the oil recovery structure 5 which are provided to the lower surface of the table 112 are the same as those in FIG. 23, but the hydraulic control valve 6 is provided to each of the systems corresponding to four corners of the table 112.

With this arrangement, although a minute control is not conducted unlike the arrangement in which the hydraulic control valve 6 is provided to each of the hydrostatic pressure guide mechanisms 1, a practically sufficient control of the hydrostatic pressure guide mechanism 1 can be conducted in each of the systems at the four corners of the table 112.

In the oil supply structure 4 of FIG. 23 or 24, a plurality of oil supply devices 42 may be juxtaposed, which can increase oil supply capability. Alternatively, the plurality of oil supply devices 42 may be respectively provided to the systems of the hydrostatic pressure guide mechanisms 1, which are usable for adjusting the oil supply capability of the systems.

In the exemplary embodiment, it is only required that the movement member 2 and the guide member 29 are provided as two members relatively movable in each of the movement mechanisms (21 to 23) of each of the components of the machine tool 110 of FIG. 1. Specifically, it is only required that the member to which the seal member 3, the oil supply structure 4 and the oil recovery structure 5 are formed is defined as the movement member 2 and the other member is defined as the guide member 29.

The two members relatively movable to each other are exemplified by a set of a rail and a slider defining the guide mechanism of the machine tool 110. A combination of the guide member 29 extending in the moving direction and the movement member 2 relatively movable along the guide member 29 is a requisite. The guide member 29 and the movement member 2 move relatively to each other. For instance, the movement member 2 may be fixed to the machine tool 110 and the guide member 29 may move relatively to the movement member 2.

In the exemplary embodiment, it is only required to determine a length of each of the movement member 2 and the guide member 29 as needed. In other words, one of the movement member 2 and the guide member 29 may be longer than the other thereof, or alternatively, both thereof may have the same length.

In the exemplary embodiment, it is only required that a main structure (e.g., the static pressure pocket P defining the hydrostatic pressure structure) of the hydrostatic pressure guide mechanism 1 is basically provided to the movement member 2.

Further, the movement member 2 and the guide member 29 may be respectively provided by a bearing member and a rotary shaft supported by the bearing member and rotatable around the bearing member.

In the above exemplary embodiment, the hydrostatic pressure guide mechanism is applied to the movement mechanism of the machine tool 110 having a portal supporting structure including a pair of columns 113 and the cross bar 114, but may be applied to any machine tool in other types.

Further, the hydrostatic pressure guide mechanism may be applied not only to the guide mechanism for linear movement but also to the guide mechanism at a rotary portion (e.g., a rotary support mechanism of a rotary table).

The arrangement in which the movement member 2 and the guide member 29 are respectively provided by the bearing member and the rotary shaft supported by the bearing member and rotatable around the bearing member is exemplified by a thrust bearing.

In the thrust bearing, a slide surface for receiving a thrust load in the axial direction is formed between the rotary shaft and the bearing member. The rotary shaft forming the slide surface is defined as the guide member 29. The slide surface of the guide member 29 is defined as a smooth guide surface 28. A main structure of the hydrostatic pressure guide mechanism 1 is formed on the slide surface 20 of the bearing member.

As shown in FIG. 25, a machine tool 110R includes a platform 111R and a rotary table 112R supported by the platform 111R. In order to rotatably support the rotary table 112R on the platform 111R, a plurality of hydrostatic pressure guide mechanisms 1 are provided between the rotary table 112R and the platform 111R.

The rotary table 112R is rotatably supported around a central axis of the platform 111R. The guide surface 28 is formed as a surface facing the platform 111R.

On the platform 111R, the plurality of hydrostatic pressure guide mechanisms 1 are arranged on a circumference of a circle centered at the central axis in a manner to face the guide surface 28 of the rotary table 112R.

Further, a part of each of the hydrostatic pressure guide mechanisms 1 which is covered with the guide surface 28 of the rotary table 112R is defined as the movement member. A surface of the movement member facing the guide surface 28 is defined as the slide surface 20.

As shown in FIG. 26, the oil supply structure 4 and the oil recovery structure 5 are provided in the platform 111R. The oil supply structure 4 and the oil recovery structure 5 are connected to each of the plurality of hydrostatic pressure guide mechanisms 1. The plurality of hydrostatic pressure guide mechanisms 1 are grouped into, for instance, three. The oil supply structure 4 and the oil recovery structure 5 are also grouped accordingly and connected to the common oil tank 41 and oil supply device 42.

The hydraulic control valve 6 is provided to the oil supply structure 4 of each of the hydrostatic pressure guide mechanisms 1.

In the exemplary embodiment, the hydrostatic pressure guide mechanism 1 can function as the thrust bearing between the rotary table 112R and the platform 111R. In the hydrostatic pressure guide mechanism 1 with this arrangement, the same advantages as those described above in the first to third exemplary embodiments can be obtained. Further, since the oil supply structure 4 and the oil recovery structure 5 are used in common in the plurality of hydrostatic pressure guide mechanisms 1, the arrangement of the device can be simplified. Since the hydraulic control valve 6 is provided to each of the hydrostatic pressure guide mechanisms 1, each of the hydrostatic pressure guide mechanisms 1 is minutely controllable with the hydraulic control valve 6 while the oil supply structure 4 and the oil recovery structure 5 can be used in common.

It should be noted that, when the oil supply structure 4 and the oil recovery structure 5 are used in common, the hydraulic control valve 6 may be provided to each of the oil supply structure 4 and the oil recovery structure 5 instead of being provided to each of the hydrostatic pressure guide mechanisms 1.

In FIG. 27, the basic structures of the hydrostatic pressure guide mechanism 1, the oil supply structure 4 and the oil recovery structure 5, which are provided between the rotary table 112R and the platform 111R, are the same as those in FIG. 23, but the hydraulic control valve 6 is provided to each of the systems of the oil supply structure 4.

With this arrangement, although a minute control is not conducted unlike the arrangement in which the hydraulic control valve 6 is provided to each of the hydrostatic pressure guide mechanisms 1, a practically sufficient control of the hydrostatic pressure guide mechanism 1 in each of the systems can be conducted.

As shown in FIGS. 25 to 27, the oil supply structure 4 and the oil recovery structure 5 are provided in the platform 111R and the main structure (e.g., the seal member 3 and the placement groove 21) of the hydrostatic pressure guide mechanism 1 are also provided in the platform 111R. However, the above components may be provided in the rotary table 112R. In this arrangement, a lubricating oil for the hydrostatic pressure guide mechanism 1 may be supplied from the bearing member to the rotary member through a rotary joint.

In an arrangement in which the shaft member is fixed and the bearing member surrounding the shaft member is rotated, it is only required that, when the fixed shaft member is defined as the movement member 2 and the seal member 3, the oil supply structure 4 and the oil recovery structure 5 are formed on the slide surface 20 of the movement member 2, and that, when the bearing member is defined as the guide member 29, the guide surface 28 is formed on a surface of the guide member 29.

It should be noted that the invention is applicable to a radial bearing. In the radial bearing, the hydrostatic pressure guide mechanism 1 is formed in a curve between an outer circumferential surface of the shaft member and an inner circumferential surface of the bearing member.

In the first, second and third exemplary embodiments, the seal member 3, 301 is described as the hermetically closing member. However, the hermetically closing member is not limited to the seal member 3, 301 but is only required to have the same functions as the seal member 3, 301.

In the slide surface 20, a region on an outside of the placement groove 21 may be lower than a region on an inside of the placement groove 21. With this arrangement, slide resistance can be further reduced.

What is claimed is:
1. A hydrostatic pressure guide mechanism comprising:
a guide member having a smooth guide surface;
a movement member having a slide surface facing the guide surface and an annular placement groove formed on the slide surface;
an annular hermetically-closing member that is disposed in the placement groove and forms hermetic contact with the guide surface when the movement member and the guide member are disposed to face each other to define a space hermetically sealed by the slide surface, the guide surface, and the hermetically-closing member;
an oil supply structure configured to supply oil into a region on the slide surface surrounded by the hermetically closing member; and
an oil recovery structure configured to recover the oil from the region on the slide surface surrounded by the hermetically closing member, wherein
the oil recovery structure comprises a recovery hole that is formed in the region on the slide surface surrounded by the hermetically closing member, the recovery hole being opened on the slide surface;

the slide surface of the movement member comprises a pressure holding surface surrounding the recovery hole, and a flank surface surrounding the pressure holding surface; and a height of the pressure holding surface is higher than a height of the flank surface such that the pressure holding surface is positioned closer to the guide member than the flank surface is positioned relative to the guide member when the movement member is placed to face the guide member.

2. The hydrostatic pressure guide mechanism according to claim 1, further comprising:

a hydraulic control valve configured to adjust a pressure or a flow rate of the oil to be supplied into the region on the slide surface surrounded by the hermetically closing member so as to adjust a pressure applied to the guide surface of the oil to be supplied to the region on the slide surface surrounded by the hermetically closing member.

3. The hydrostatic pressure guide mechanism according to claim 1, wherein the oil supply structure comprises an annular oil supply groove surrounding the recovery hole.

4. A machine tool comprising: a guide mechanism provided with plural ones of the hydrostatic pressure guide mechanisms according to claim 1.

5. The machine tool according to claim 4, wherein the oil supply structure and the oil recovery structure are used in common in the plural ones of the hydrostatic pressure guide mechanisms.

6. The machine tool according to claim 5, wherein the oil supply structure comprises a hydraulic control valve for each of the plural ones of the hydrostatic pressure guide mechanisms.

7. The machine tool according to claim 5, wherein the oil supply structure comprises a hydraulic control valve for each of systems comprising the plural ones of the hydrostatic pressure guide mechanisms.

* * * * *